United States Patent
Kidambi

(10) Patent No.: US 12,418,033 B2
(45) Date of Patent: Sep. 16, 2025

(54) CATALYTIC PROTON TRANSPORT MEMBRANES AND METHODS OF MAKING AND USE THEREOF

(71) Applicant: VANDERBILT UNIVERSITY, Nashville, TN (US)

(72) Inventor: Piran Ravichandran Kidambi, Nashville, TN (US)

(73) Assignee: VANDERBILT UNIVERSITY, Nashville, TN (US)

( * ) Notice: Subject to any disclaimer, the term of this patent is extended or adjusted under 35 U.S.C. 154(b) by 598 days.

(21) Appl. No.: 17/638,353

(22) PCT Filed: Aug. 28, 2020

(86) PCT No.: PCT/US2020/048372
§ 371 (c)(1),
(2) Date: Feb. 25, 2022

(87) PCT Pub. No.: WO2021/041788
PCT Pub. Date: Mar. 4, 2021

(65) Prior Publication Data
US 2022/0293965 A1 Sep. 15, 2022

Related U.S. Application Data

(60) Provisional application No. 62/893,261, filed on Aug. 29, 2019.

(51) Int. Cl.
*H01M 4/90* (2006.01)
*B01D 7/02* (2006.01)
*B01D 69/12* (2006.01)
*B01D 71/02* (2006.01)
*H01M 4/88* (2006.01)
(Continued)

(52) U.S. Cl.
CPC .......... *H01M 4/9083* (2013.01); *B01D 69/12* (2013.01); *B01D 71/0211* (2022.08); *B01D 71/0223* (2022.08); *H01M 4/881* (2013.01); *H01M 4/8867* (2013.01); *H01M 4/9075* (2013.01); *H01M 4/925* (2013.01); *H01M 4/926* (2013.01);
(Continued)

(58) Field of Classification Search
None
See application file for complete search history.

(56) References Cited

U.S. PATENT DOCUMENTS

2017/0263966 A1 9/2017 Lozada et al.
2021/0384540 A1* 12/2021 Mistry ............... H01M 4/926

FOREIGN PATENT DOCUMENTS

EP 3194072 A1 7/2017

OTHER PUBLICATIONS

Extended European Search Report mailed Aug. 22, 2023 in corresponding EP Application 20857997.7 (17 pages).
(Continued)

*Primary Examiner* — Jonathan Crepeau
(74) *Attorney, Agent, or Firm* — Meunier Carlin & Curfman LLC

(57) ABSTRACT

Disclosed herein are catalytic proton transport membranes and methods of making an use thereof. The catalytic proton transport membranes comprising a two-dimensional (2D) material having a top surface and a bottom surface, wherein the top surface further comprises a catalytic material deposited thereon, wherein the membrane allows for proton transport through the membrane.

19 Claims, 22 Drawing Sheets

(51) Int. Cl.
  *H01M 4/92*    (2006.01)
  *H01M 8/1004*  (2016.01)
  *H01M 8/1039*  (2016.01)
  *H01M 8/1041*  (2016.01)

(52) U.S. Cl.
  CPC ....... *H01M 8/1004* (2013.01); *H01M 8/1039* (2013.01); *H01M 8/1041* (2013.01)

(56) References Cited

OTHER PUBLICATIONS

Bayer et al. Characterization of a graphene oxide membrane fuel cell, Journal of Power Sources, 2014, 272, 239-247.
Achtyl et al. Aqueous Proton Transfer across Single-Layer Graphene. Nat. Commun. 2015, 6, 6539.
Bartolomei et al. Graphene Multi-Protonation: A Cooperative Mechanism for Proton Permeation. Carbon N. Y. 2019, 144, 724-730.
Batzill. The Surface Science of Graphene: Metal Interfaces, CVD Synthesis, Nanoribbons, Chemical Modifications, and Defects. Surf. Sci. Rep. 2012, 67, 83-115.
Blume R et al. The Influence of Intercalated Oxygen on the Properties of Graphene on Polycrystalline Cu under Various Environmental Conditions. Phys. Chem. Chem. Phys. 2014, 16, 25989-26003.
Boutilier et al. Molecular Sieving Across Centimeter-Scale Single-Layer Nanoporous Graphene Membranes. ACS Nano 2017, 11, 5726-5736.
Britnell et al. Electron Tunneling through Ultrathin Boron Nitride Crystalline Barriers. Nano Lett. 2012, 12, 1707-1710.
Bukola et al. Charge-Transfer Resistance Model and Arrhenius Activation Analysis for Hydrogen Ion Transmission across Single-Layer Graphene. Electrochim. Acta 2019, 296, 1-7.
Bukola et al. Selective Proton/Deuteron Transport through NafionlGraphenelNafion Sandwich Structures at High Current Density. J. Am. Chem. Soc. 2018, 140, 1743-1752.
Bukola. Electrically-Driven Ion Transmission Through Two-Dimensional Nanomaterials, Thesis, Clemson University, 2019, 285 pages.
Bunch et al. Impermeable Atomic Membranes from Graphene Sheets. Nano Lett. 2008, 8, 2458-2462.
Butt H et al. Visible Diffraction from Graphene and Its Application in Holograms. Adv. Opt. Mater. 2013, 1, 869-874.
Dlubak et al. Substrate-Assisted Nucleation of Ultra-Thin Dielectric Layers on Graphene by Atomic Layer Deposition. Appl. Phys. Lett. 2012, 100, 173113.
Falin et al. Mechanical Properties of Atomically Thin Boron Nitride and the Role of Interlayer Interactions. Nat. Commun. 2017, 8, 15815.
Feng et al. Hydrogenation Facilitates Proton Transfer through Two-Dimensional Honeycomb Crystals. J. Phys. Chem. Lett. 2017, 8, 6009-6014.
Holmes et al. 2D Crystals Significantly Enhance the Performance of a Working Fuel Cell. Adv. Energy Mater. 2017, 7, 1-7.
Hu et al. Proton Transport through One-Atom-Thick Crystals. Nature 2014, 516, 227-230.
Huang et al. Grains and Grain Boundaries in Single-Layer Graphene Atomic Patchwork Quilts. Nature 2011, 469, 389-392.
Karnik. Materials Science: Breakthrough for Protons. Nature 2014, 516, 173-175.
Kidambi et al. A Scalable Route to Nanoporous Large-Area Atomically Thin Graphene Membranes by Roll-to-Roll Chemical Vapor Deposition and Polymer Support Casting. ACS Appl. Mater. Interfaces 2018, 10, 10369-10378.
Kidambi et al. Assessment and Control of the Impermeability of Graphene for Atomically Thin Membranes and Barriers. Nanoscale 2017, 9, 8496-8507.
Kidambi et al. Facile Fabrication of Large-Area Atomically Thin Membranes by Direct Synthesis of Graphene with Nanoscale Porosity. Adv. Mater. 2018, 1804977, 1804977.
Kidambi et al. Hafnia Nanoparticles—a Model System for Graphene Growth on a Dielectric. Phys. status solidi—Rapid Res. Lett. 2011, 5, 341-343.
Kidambi et al. In Situ Observations during Chemical Vapor Deposition of Hexagonal Boron Nitride on Polycrystalline Copper. Chem. Mater. 2014, 26, 6380-6392.
Kidambi et al. Multifunctional Oxides for Integrated Manufacturing of Efficient Graphene Electrodes for Organic Electronics. Appl. Phys. Lett. 2015, 106, 063304.
Kidambi et al. Nanoporous Atomically Thin Graphene Membranes for Desalting and Dialysis Applications. Adv. Mater. 2017, 29, 1700277.
Kidambi et al. Observing Graphene Grow: Catalyst-Graphene Interactions during Scalable Graphene Growth on Polycrystalline Copper. Nano Lett. 2013, 13, 4769-4778.
Kidambi et al. Selective Nanoscale Mass Transport across Atomically Thin Single Crystalline Graphene Membranes. Adv. Mater. 2017, 29, 1605896.
Kidambi et al. The Parameter Space of Graphene Chemical Vapor Deposition on Polycrystalline Cu. J. Phys. Chem. C 2012, 116, 22492-22501.
Kim et al. Synthesis of Monolayer Hexagonal Boron Nitride on Cu Foil Using Chemical Vapor Deposition. Nano Lett. 2012, 12, 161-166.
Kim et al. Selective Metal Deposition at Graphene Line Defects by Atomic Layer Deposition. Nat. Commun. 2014, 5, 1-9.
Kong et al. Graphene-Based Ultrathin Flat Lenses. ACS Photonics 2015, 2, 200-207.
Kratzer M et al. Effects of Polymethylmethacrylate-Transfer Residues on the Growth of Organic Semiconductor Molecules on Chemical Vapor Deposited Graphene. Appl. Phys. Lett. 2015, 106, 103101.
Kroes et al. Density Functional Based Simulations of Proton Permeation of Graphene and Hexagonal Boron Nitride. Phys. Chem. Chem. Phys. 2017, 19, 5813-5817.
Kuruvila et al. Organic Light Emitting Diodes with Environmentally and Thermally Stable Doped Graphene Electrodes. J. Mater. Chem. C 2014, 2, 6940.
Lehtinen et al. Production of Defects in Hexagonal Boron Nitride Monolayer under Ion Irradiation. Nucl. Instruments Methods Phys. Res. Sect. B Beam Interact. with Mater. Atoms 2011, 269, 1327-1331.
Li et al. Strong Oxidation Resistance of Atomically Thin Boron Nitride Nanosheets. ACS Nano 2014, 8, 1457-1462.
Lin et al. Advances in 2D Boron Nitride Nanostructures: Nanosheets, Nanoribbons, Nanomeshes, and Hybrids with Graphene. Nanoscale 2012, 4, 6908-6939.
Lozada-Hidalgo et al. Giant Photoeffect in Proton Transport through Graphene Membranes. Nat. Nanotechnol. 2018, 13, 300-303.
Lozada-Hidalgo et al. Scalable and Efficient Separation of Hydrogen Isotopes Using Graphene-Based Electrochemical Pumping. Nat. Commun. 2017, 8, 15215.
Lozada-Hidalgo et al. Sieving Hydrogen Isotopes through Two-Dimensional Crystals. Science (80-.). 2016, 351, 68-70.
Ma et al. Clean Transfer of Graphene on Pt Foils Mediated by a Carbon Monoxide Intercalation Process. Nano Res. 2013, 6, 671-678.
Meyer et al. Metal Oxide Induced Charge Transfer Doping and Band Alignment of Graphene Electrodes for Efficient Organic Light Emitting Diodes. Sci. Rep. 2015, 4, 5380.
Miao et al. First Principles Study of the Permeability of Graphene to Hydrogen Atoms. Phys. Chem. Chem. Phys. 2013, 15, 16132.
Novoselov et al. Electric Field Effect in Atomically Thin Carbon Films. Science 2004, 306, 666-669.
O'Hern et al. Nanofiltration across Defect-Sealed Nanoporous Monolayer Graphene. Nano Lett. 2015, 15, 3254-3260.
Park et al. Atomic-Scale Etching of Hexagonal Boron Nitride for Device Integration Based on Two-Dimensional Materials. Nanoscale 2018, 10, 15205-15212.
Perconte et al. Tunable Klein-like Tunnelling of High-Temperature Superconducting Pairs into Graphene. Nat. Phys. 2017, 14, 25-29.

(56) References Cited

OTHER PUBLICATIONS

Piquemal-Banci et al. Insulator-to-Metallic Spin-Filtering in 2D-Magnetic Tunnel Junctions Based on Hexagonal Boron Nitride. ACS Nano 2018, 12, 4712-4718.

Piquemal-Banci et al. Magnetic Tunnel Junctions with Monolayer Hexagonal Boron Nitride Tunnel Barriers. Appl. Phys. Lett. 2016, 108.

Poltavsky et al. Quantum Tunneling of Thermal Protons through Pristine Graphene. J. Chem. Phys. 2018, 148, 204707.

Sanders S et al. Engineering High Charge Transfer N-Doping of Graphene Electrodes and Its Application to Organic Electronics. Nanoscale 2015, 7, 13135-13142.

Tosti et al. Membrane Processes for the Nuclear Fusion Fuel Cycle. Membranes (Basel). 2018, 8.

Tsetseris et al. Graphene: An Impermeable or Selectively Permeable Membrane for Atomic Species? Carbon N. Y. 2014, 67, 58-63.

Walker et al. Measuring the Proton Selectivity of Graphene Membranes. Appl. Phys. Lett. 2015, 107, 213104.

Wang et al. A Peeling Approach for Integrated Manufacturing of Large Monolayer H—BN Crystals. ACS Nano 2019, 13, acsnano.8b08712.

Wang L et al. Single-Layer Graphene Membranes Withstand Ultrahigh Applied Pressure. Nano Lett. 2017, 17, 3081-3088.

Wang R et al. Catalyst Interface Engineering for Improved 2D Film Lift-Off and Transfer. ACS Appl. Mater. Interfaces 2016, 8, 33072-33082.

Weatherup et al. Interdependency of Subsurface Carbon Distribution and Graphene-Catalyst Interaction. J. Am. Chem. Soc. 2014, 136, 13698-13708.

Weatherup et al. Introducing Carbon Diffusion Barriers for Uniform, High-Quality Graphene Growth from Solid Sources. Nano Lett. 2013, 13, 4624-4631.

Xi et al. Binder Free Three-Dimensional Sulphur/Few-Layer Graphene Foam Cathode with Enhanced High-Rate Capability for Rechargeable Lithium Sulphur Batteries. Nanoscale 2014, 6, 5746-5753.

Xu et al. Single Photon Emission from Plasma Treated 2D Hexagonal Boron Nitride. Nanoscale 2018, 10, 7957-7965.

Yulaev et al. Graphene Microcapsule Arrays for Combinatorial Electron Microscopy and Spectroscopy in Liquids. ACS Appl. Mater. Interfaces 2017, 9, 26492-26502.

Zhang et al. Differential Permeability of Proton Isotopes through Graphene and Graphene Analogue Monolayer. J. Phys. Chem. Lett. 2016, 7, 3395-3400.

Zhou et al. Dislocation-Driven Growth of Two-Dimensional Lateral Quantum-Well Superlattices. Sci. Adv. 2018, 4, eaap9096.

Zhu et al. A Study of Vertical Transport through Graphene toward Control of Quantum Tunneling. Nano Lett. 2018, 18, 682-688.

International Preliminary Report on Patentability issued for Application No. PCT/US2020/048372, dated Mar. 10, 2022.

International Search Report and Written Opinion dated Nov. 19, 2020, from International Application No. PCT/US2020/048372, 9 pages.

* cited by examiner

Transfer of 2D material

CATALYTIC PROTON TRANSPORT MEMBRANES AND METHODS OF MAKING AND USE THEREOF

CROSS-REFERENCE TO RELATED APPLICATIONS

This application is a U.S. national stage application filed under 35 U.S.C. § 371 of PCT/US2020/048372 filed Aug. 28, 2020, which claims the benefit of priority to U.S. Provisional Application No. 62/893,261 filed Aug. 29, 2019, each of which is hereby incorporated herein by reference in its entirety.

BACKGROUND

Membrane technologies present potential for alleviating global problems in energy that directly impact the lives of billions of people around the world. Disruptive technologies such as selective transport of protons through an atomically thin 2D material lattice can play a critical role in advancing next-generation fuel cells, hydrogen purification, isotope separation, environmental remediation, and other applications. Such advances can contribute to cleaner energy generation and improved efficiency in energy conversion to help address the causes and detrimental effects of climate change. Realizing such technological advances however hinges on the ability to precisely understand and deliberately manipulate proton transport through the 2D lattice. A fundamental understanding of the mechanisms governing proton transport though the 2D material lattice remains elusive and severely limits progress towards applications. The compositions, devices, and methods described herein address these and other needs.

SUMMARY

In accordance with the purposes of the disclosed compositions, devices, and methods, as embodied and broadly described herein, the disclosed subject matter relates to catalytic proton transport membranes and methods of making and use thereof.

Additional advantages of the disclosed devices and methods will be set forth in part in the description which follows, and in part will be obvious from the description. The advantages of the disclosed devices will be realized and attained by means of the elements and combinations particularly pointed out in the appended claims. It is to be understood that both the foregoing general description and the following detailed description are exemplary and explanatory only and are not restrictive of the disclosed devices and methods, as claimed.

The details of one or more embodiments of the invention are set forth in the accompanying drawings and the description below. Other features, objects, and advantages of the invention will be apparent from the description and drawings, and from the claims.

DESCRIPTION OF FIGURES

The accompanying figures, which are incorporated in and constitute a part of this specification, illustrate several aspects of the disclosure, and together with the description, serve to explain the principles of the disclosure.

DETAILED DESCRIPTION

Figure 1:
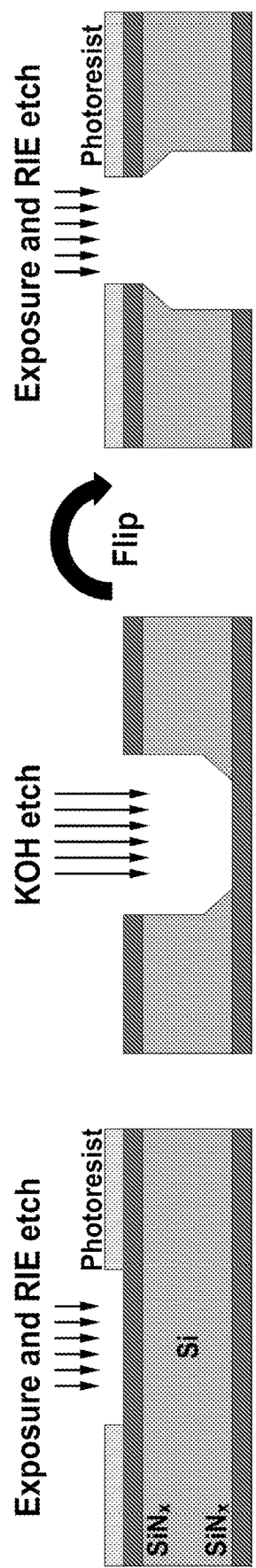
FIG. 1. Schematic of microfabrication process for devices.

The compositions, devices, and methods described herein may be understood more readily by reference to the following detailed description of specific aspects of the disclosed subject matter and the Examples included therein.

Before the present compositions, devices, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "the compound" includes mixtures of two or more such compounds, reference to "an agent" includes mixture of two or more such agents, and the like.

"Optional" or "optionally" means that the subsequently described event or circumstance can or cannot occur, and that the description includes instances where the event or circumstance occurs and instances where it does not.

It is understood that throughout this specification the identifiers "first" and "second" are used solely to aid the reader in distinguishing the various components, features, or steps of the disclosed subject matter. The identifiers "first" and "second" are not intended to imply any particular order, amount, preference, or importance to the components or steps modified by these terms.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

Disclosed herein are catalytic proton transport membranes comprising a two-dimensional (2D) material having a top surface and a bottom surface, wherein the top surface further comprises a catalytic material deposited thereon, wherein the membrane allows for proton transport through the membrane.

The two-dimensional material can, for example, comprise graphene, hexagonal boron nitride (h-BN), a transition metal dichalcogenide, a covalent organic framework, a metal organic framework, ultra-thin oxides, mica, or a combination thereof. In some examples, the two-dimensional material can comprise graphene, hexagonal boron nitride (h-BN), or a combination thereof. In some examples, the two-dimensional material comprises graphene. In some examples, the two-dimensional material comprises monolayer graphene. In some examples, the two-dimensional material comprises h-BN. In some examples, the two-dimensional material comprises monolayer h-BN. In some examples, the 2D material has lattice transparency. In some examples, the two-dimensional material can comprise graphene, hexagonal boron nitride (h-BN), or a combination thereof and the 2D material comprises large single crystal domains substantially free of grain boundaries or a polycrystalline film.

In some examples, the 2D material is permeated by one or more pores, one or more defects, or a combination thereof. Defects include, but are not limited to, pentagon-heptagon rings, Stone Wales defects, missing atoms (e.g., from 1 to 20 missing atoms), etc.

The two-dimensional material can, for example, have an average thickness of 1.5 nanometers (nm) or less (e.g., 1.45 nm or less, 1.4 nm or less, 1.35 nm or less, 1.3 nm or less, 1.25 nm or less, 1.2 nm or less, 1.15 nm or less, 1.1 nm or less, 1.05 nm or less, 1 nm or less, 0.95 nm or less, 0.9 nm or less, 0.85 nm or less, 0.8 nm or less, 0.75 nm or less, 0.7 nm or less, 0.65 nm or less, 0.6 nm or less, 0.55 nm or less, 0.5 nm or less, 0.45 nm or less, 0.4 nm or less, 0.35 nm or less, 0.3 nm or less, 0.25 nm or less, 0.2 nm or less, or 0.15 nm or less). In some examples, the two-dimensional material can have an average thickness of 0.1 nm or more (e.g., 0.15 nm or more, 0.2 nm or more, 0.25 nm or more, 0.3 nm or more, 0.35 nm or more, 0.4 nm or more, 0.45 nm or more, 0.5 nm or more, 0.55 nm or more, 0.6 nm or more, 0.65 nm or more, 0.7 nm or more, 0.75 nm or more, 0.8 nm or more, 0.85 nm or more, 0.9 nm or more, 0.95 nm or more, 1 nm or more, 1.05 nm or more, 1.1 nm or more, 1.15 nm or more, 1.2 nm or more, 1.25 nm or more, 1.3 nm or more, 1.35 nm or more, or 1.4 nm or more). The average thickness of the two-dimensional material can range from any of the minimum values described above to any of the maximum values described above. For example, the two-dimensional material can have an average thickness of from 0.1 nm to 1.5 nm (e.g., from 0.1 nm to 1.3 nm, from 0.1 nm to 1 nm, from 0.1 nm to 0.9 nm, from 0.1 nm to 0.8 nm, from 0.1 nm to 0.7 nm, from 0.1 nm to 0.6 nm, from 0.1 nm to 0.5 nm, from 0.2 nm to 0.5 nm, or from 0.3 nm to 0.4 nm).

The two-dimensional material can have any suitable lateral dimension, for example the desired lateral dimension can be selected in view of the desired use of the catalytic proton transport membrane. In some examples, the two-dimensional material can have a lateral dimension of 100 nm or more (e.g., 125 nm or more, 150 nm or more, 175 nm or more, 200 nm or more, 225 nm or more, 250 nm or more, 300 nm or more, 350 nm or more, 400 nm or more, 450 nm or more, 500 nm or more, 600 nm or more, 700 nm or more, 800 nm or more, 900 nm or more, 1 micrometer (micron, μm) or more, 2 μm or more, 3 μm or more, 4 μm or more, 5 μm or more, 6 μm or more, 7 μm or more, 8 μm or more, 9 μm or more, 10 μm or more, 15 μm or more, 20 μm or more, 25 μm or more, 30 μm or more, 35 μm or more, 40 μm or more, 45 μm or more, 50 μm or more, 60 μm or more, 70 μm or more, 80 μm or more, 90 μm or more, 100 μm or more, 125 μm or more, 150 μm or more, 175 μm or more, 200 μm or more, 225 μm or more, 250 μm or more, 300 μm or more, 350 μm or more, 400 μm or more, 450 μm or more, 500 μm or more, 600 μm or more, 700 μm or more, 800 μm or more, 900 μm or more, 1 millimeter (mm) or more, 2 mm or more, 3 mm or more, 4 mm or more, 5 mm or more, 6 mm or more, 7 mm or more, 8 mm or more, 9 mm or more, 1 centimeter (cm) or more, 2 cm or more, 3 cm or more, 4 cm or more, 5 cm or more, 6 cm or more, 7 cm or more, 8 cm or more, 9 cm or more, 10 cm or more, 15 cm or more, 20 cm or more, 25 cm or more, 30 cm or more, 35 cm or more, 40 cm or more, 45 cm or more, 50 cm or more, 60 cm or more, 70 cm or more, 80 cm or more, or 90 cm or more). In some examples, the two-dimensional material can have a lateral dimension of 1 meter or less (e.g., 90 cm or less, 80 cm or less, 70 cm or less, 60 cm or less, 50 cm or less, 45 cm or less, 40 cm or less, 35 cm or less, 30 cm or less, 25 cm or less, 20 cm or less, 15 cm or less, 10 cm or less, 9 cm or less, 8 cm or less, 7 cm or less, 6 cm or less, 5 cm or less, 4 cm or less, 3 cm or less, 2 cm or less, 1 cm or less, 10 mm or less, 9 mm or less, 8 mm or less, 7 mm or less, 6 mm or less, 5 mm or less, 4 mm or less, 3 mm or less, 2 mm or less, 1 mm or less, 900 μm or less, 800 μm or less, 700 μm or less, 600 μm or less, 500 μm or less, 450 μm or less, 400 μm or less, 350 μm or less, 300 μm or less, 250 μm or less, 225 μm or less, 200 μm or less, 175 μm or less, 150 μm or less, 125 μm or less, 100 μm or less, 90 μm or less, 80 μm or less, 70 μm or less, 60 μm or less, 50 μm or less, 45 μm or less, 40 μm or less, 35 μm or less, 30 μm or less, 25 μm or less, 20 μm or less, 15 μm or less, 10 μm or less, 9 μm or less, 8 μm or less, 7 μm or less, 6 μm or less, 5 μm or less, 4 μm or less, 3 μm or less, 2 μm or less, 1 μm or less, 900 nm or less, 800 nm or less, 700 nm or less, 600 nm or less, 500 nm or less, 450 nm or less, 400 nm or less, 350 nm or less, 300 nm or less, 250 nm or less, 225 nm or less, 200 nm or less, 175 nm or less, 150 nm or less, or 125 nm or less). The lateral dimension of the two-dimensional material can range from any of the minimum values described above to any of the maximum values described above. For example, the two-dimensional material can have a lateral dimension of from 100 nm to 1 m (e.g., from 100 nm to 1 μm, from 1 μm to 1 mm, from 1 mm to 1 m, from 100 nm to 500 cm, from 100 nm to 1 cm, from 100 nm to 1 mm, from 1 μm to 1 m, from 1 cm to 1 m, from 500 cm to 1 m, or from 1 μm to 1 cm).

The catalytic material can comprise any suitable material, for example the catalytic material can be selected in view of the desired use of the catalytic transport membrane. In some examples, the catalytic material can comprise Be, Mg, Al, Ca, Sc, Ti, V, Cr, Mn, Fe, Co, Ni, Cu, Zn, Ga, Sr, Y, Zr, Nb, Mo, Tc, Ru, Rh, Pd, Ag, Cd, In, Sn, Ba, Hf, Ta, W, Re, Os, Ir, Pt, Au, Hg, Tl, Pb, Bi, La, Ce, Pr, Nd, Pm, Sm, Eu, Gd, Tb, Dy, Ho, Er, Tm, Yb, or a combination thereof. In some examples, the catalytic material can comprise Al, Ti, Cr, Mn, Fe, Co, Ni, Cu, Mo, Rh, Pd, Ag, Cd, Pt, Au, Zn, Ga, Pb, or a combination thereof. In some examples, the catalytic material comprises Pt.

In some examples, the catalytic material comprises a plurality of particles, such as a plurality of islands disposed on the top surface of the 2D material. The plurality of particles can, for example, have an average particle size. "Average particle size" and "mean particle size" are used interchangeably herein, and generally refer to the statistical mean particle size of the particles in a population of particles. For example, the average particle size for a plurality of particles with a substantially spherical shape can comprise the average diameter of the plurality of particles. For a particle with a substantially spherical shape, the diameter of a particle can refer, for example, to the hydrodynamic diameter. As used herein, the hydrodynamic diameter of a particle can refer to the largest linear distance between two points on the surface of the particle. Mean particle size can be measured using methods known in the art, such as evaluation by scanning electron microscopy, transmission electron microscopy, and/or dynamic light scattering.

The plurality of particles can, for example, have an average particle size of a single atom or more. In some examples, the plurality of particles can have an average particle size of 0.1 nm or more (e.g., 0.2 nm or more, 0.3 nm or more, 0.4 nm or more, 0.5 nm or more, 0.75 nm or more, 1 nm or more, 1.25 nm or more, 1.5 nm or more, 1.75 nm or more, 2 nm or more, 2.25 nm or more, 2.5 nm or more, 3 nm or more, 3.5 nm or more, 4 nm or more, 4.5 nm or more, 5 nm or more, 6 nm or more, 7 nm or more, 8 nm or more, 9 nm or more, 10 nm or more, 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 300 nm or more, 350 nm or more, 400 nm or more, 450 nm or more, 500 nm or more, 600 nm or more, 700 nm or more, 800 nm or more, or 900 nm or more). In some examples, the plurality of particles can have an average particle size of 1 micron or less (e.g., 900 nm or less, 800 nm or less, 700 nm or less, 600 nm or less, 500 nm or less, 450 nm or less, 400 nm or less, 350 nm or less, 300 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, 20 nm or less, 15 nm or less, 10 nm or less, 9 nm or less, 8 nm or less, 7 nm or less, 6 nm or less, 5 nm or less, 4.5 nm or less, 4 nm or less, 3.5 nm or less, 3 nm or less, 2.5 nm or less, 2.25 nm or less, 2 nm or less, 1.75 nm or less, 1.5 nm or less, 1.25 nm or less, 1 nm or less, 0.75 nm or less, or 0.5 nm or less). The average particle size of the plurality of particles can range from any of the minimum values described above to any of the maximum values described above. For example, the plurality of particles can have an average particle size of from 1 atom to 1 micron (e.g., from 1 atom to 500 nm, from 500 nm to 1 micron, from 1 atom to 1 nm, from 1 nm to 10 nm, from 10 nm to 100 nm, from 100 nm to 1 micron, from 1 atom to 100 nm, from 100 nm to 1 micron, or from 0.1 nm to 1 micron).

In some examples, the catalytic material comprises a layer, such as a substantially continuous layer. In some examples, the layer is permeated by one or more pores, one or more defects, or a combination thereof. The layer can, for example, have an average thickness. "Average thickness" and "mean thickness" are used interchangeably herein. Average thickness can be measured using methods known in the art, such as evaluation by profilometry, cross-sectional electron microscopy, atomic force microscopy (AFM), ellipsometry, or combinations thereof. In some examples, the layer can have an average thickness of 0.1 nm or more (e.g., 0.2 nm or more, 0.3 nm or more, 0.4 nm or more, 0.5 nm or more, 0.75 nm or more, 1 nm or more, 1.25 nm or more, 1.5 nm or more, 1.75 nm or more, 2 nm or more, 2.25 nm or more, 2.5 nm or more, 3 nm or more, 3.5 nm or more, 4 nm or more, 4.5 nm or more, 5 nm or more, 6 nm or more, 7 nm or more, 8 nm or more, 9 nm or more, 10 nm or more, 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 300 nm or more, 350 nm or more, 400 nm or more, 450 nm or more, 500 nm or more, 600 nm or more, 700 nm or more, 800 nm or more, or 900 nm or more). In some examples, the layer can have an average thickness of 1 micron or less (e.g., 900 nm or less, 800 nm or less, 700 nm or less, 600 nm or less, 500 nm or less, 450 nm or less, 400 nm or less, 350 nm or less, 300 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, 20 nm or less, 15 nm or less, 10 nm or less, 9 nm or less, 8 nm or less, 7 nm or less, 6 nm or less, 5 nm or less, 4.5 nm or less, 4 nm or less, 3.5 nm or less, 3 nm or less, 2.5 nm or less, 2.25 nm or less, 2 nm or less, 1.75 nm or less, 1.5 nm or less, 1.25 nm or less, 1 nm or less, 0.75 nm or less, or 0.5 nm or less). The average thickness of the layer can range from any of the minimum values described above to any of the maximum values described above. For example, the layer can have an average thickness of from 1 atom to 1 micron (e.g., from 1 atom to 500 nm, from 500 nm to 1 micron, from 1 atom to 1 nm, from 1 nm to 10 nm, from 10 nm to 100 nm, from 100 nm to 1 micron, from 1 atom to 100 nm, from 100 nm to 1 micron, or from 0.1 nm to 1 micron). In some examples, the layer has an average thickness of to 1 nm.

In some examples, the catalytic proton transport membrane can further comprise a first proton conducting polymer layer, wherein the first proton conducting polymer layer comprises a first proton conducting polymer, and wherein: the first proton conducting polymer layer is disposed on the bottom surface of the two-dimensional material such that the two-dimensional material is disposed between the first proton conducting polymer layer and the catalytic material, the first proton conducting polymer layer is disposed on the catalytic material such that the catalytic material is disposed between the two-dimensional material and the first proton conducting polymer layer, or a combination thereof. In some examples, the catalytic proton transport membrane can further comprise a second proton conducting polymer layer, wherein the second proton conducting polymer layer comprises a second proton conducting polymer that is different than the first proton conducting polymer, wherein the first proton conducting polymer layer is disposed on the bottom surface of the two-dimensional material such that the two-dimensional material is disposed between the first proton conducting polymer layer and the catalytic material, and wherein the second proton conducting polymer layer is disposed on the catalytic material such that the catalytic material is disposed between the two-dimensional material and the second proton conducting polymer layer.

The first proton conducting polymer and/or the second proton conducting polymer can comprise(s) any suitable proton conducting polymer, for example the first proton conducting polymer and/or the second proton conducting polymer can be selected in view of the desired use of the catalytic proton transport membrane. In some examples, the first proton conducting polymer, the second proton conducting polymer, or a combination thereof comprise(s) a polyether, a polysulfonate, a polysulfone, a poly(imidazole), a triazole, a benzimidazole, a polyester, a polycarbonate, a polymer derived from a pyridine monomer, a polyethylene, a fluoropolymer, derivatives thereof, or combinations thereof. In some examples, the first proton conducting polymer, the second proton conducting polymer, or a combination thereof comprise(s) a sulfonated fluoropolymer. In some examples, the first proton conducting polymer, the second proton conducting polymer, or a combination thereof comprise(s) a tetrafluoroethylene based polymer or a derivative thereof. In some examples, the first proton conducting polymer, the second proton conducting polymer, or a combination thereof comprise(s) a sulfonated tetrafluoroethylene based polymer. In some examples, the first proton conducting polymer, the second proton conducting polymer, or a combination thereof comprise(s) a copolymer of tetrafluoroethylene and perfluoro-3,6-dioxa-4-methyl-7-octene-sulfonic acid (Nafion), poly(tetrafluoroethylene-co-2,2,4-trifluoro-5-trifluoromethoxy-1,3-dioxole) (Hyflon), derivatives thereof, or combinations thereof. In some examples, the first proton conducting polymer, the second proton conducting polymer, or a combination thereof comprise(s) a poly(imidazole).

In some examples, the catalytic proton transport membrane forms a free-standing membrane. In some examples, the catalytic proton support membrane is supported by a substrate. Examples of suitable substrates include, but are not limited to, polymers (e.g., porous polymers), glass fibers, glass, quartz, silicon, nitrides (e.g., silicon nitride), and combinations thereof.

Also described herein are catalytic proton transport devices comprising any of the catalytic proton transport membranes described herein. In some examples, the catalytic proton transport device comprises a plurality of the catalytic proton transport membranes. For example, the plurality of catalytic proton transport membranes can be stacked together to form the catalytic proton transport device. In some examples, the catalytic proton transport device comprises a suspended catalytic proton transport membrane, a liquid-cell device, a nafion-catalytic proton transport membrane proton pump device, a nafion-catalytic proton transport membrane-nafion sandwich proton pump device, a nafion-catalytic proton transport membrane-Pd and/or Pt proton pump device coupled to a mass spectrometer, or a combination thereof.

Also described herein are methods of making the catalytic proton transport membranes described herein. For example, the methods can comprise depositing the catalytic material on the top surface of the 2D material. The catalytic material can be deposited on the 2D material by any suitable technique, for example, by thin film processing techniques (e.g., sputtering, pulsed layer deposition, molecular beam epitaxy, electron beam deposition, thermal deposition, evaporation, atomic layer deposition, or combinations thereof), printing, lithographic deposition, spin coating, drop-casting, zone casting, dip coating, blade coating, spraying, vacuum filtration, or combinations thereof.

In some examples, the methods can further comprise making the two-dimensional material. For example, the two-dimensional material can be made using a chemical vapor deposition (CVD) process.

In some examples, the catalytic transport membrane further comprises the first proton transport polymer layer and the method further comprises: disposing the first proton transport polymer layer on the bottom surface of the two-dimensional material such that the two-dimensional material is disposed between the first proton conducting polymer layer and the catalytic material, disposing the first proton conducting polymer layer on the catalytic material such that the catalytic material is disposed between the two-dimensional material and the first proton conducting polymer layer, or a combination thereof. In some examples, the catalytic transport membrane further comprises the second proton conducting polymer layer and the method further comprises disposing the first proton conducting polymer layer on the bottom surface of the two-dimensional material such that the two-dimensional material is disposed between the first proton conducting polymer layer and the catalytic material, and disposing the second proton conducting polymer layer on the catalytic material such that the catalytic material is disposed between the two-dimensional material and the second proton conducting polymer layer. The first proton conducting polymer layer, the second proton conducting layer, or a combination thereof can be deposited, for example, via printing, lithographic deposition, spin coating, drop-casting, zone casting, dip coating, blade coating, spraying, vacuum filtration, or combinations thereof.

Also described herein are methods of use of the catalytic proton transport membranes and/or the catalytic proton transport devices described herein. For example, the methods can comprise using the catalytic proton transport membrane or catalytic proton transport device in a fuel cell, in a gas purification, in an energy conversion process, in environmental remediation, in an isotope separation, in a detector, in a membrane electrode application, or a combination thereof.

In some examples, the method comprises using the catalytic proton transport membrane or catalytic proton transport device in a gas purification. For example, the gas purification can comprise $D_2$-He separation; tritium-$^3$He separation; separation of H, D, and/or T from a mixture of HD, TD, and/or HT; or a combination thereof. In some examples, the gas purification comprises hydrogen gas purification.

In some examples, the method comprises using the catalytic proton transport membrane or catalytic proton transport device in an isotope separation. For example, the isotope separation can comprise hydrogen isotope separation. In some examples, the isotope separation comprises a $^1$H-D separation. In some examples, the isotope separation has an isotope separation factor (e.g., isotope selectivity) of 1 or more (e.g. 2 or more, 3 or more, 4 or more, 5 or more, 10 or more, 15 or more, 20 or more, 25 or more, 30 or more, 35 or more, 40 or more, 45 or more, 50 or more, 60 or more, 70 or more, 80 or more, 90 or more, or 100 or more).

Also disclosed herein are methods of use of the catalytic proton transport membranes or the catalytic transport devices disclosed herein, the methods comprising using the catalytic proton transport membrane or catalytic proton transport device for remote catalysis. For example, a compound can be present proximate the catalytic proton transport membranes or the catalytic transport devices disclosed herein but wherein the catalytic material is not in direct contact with the compound. For example, when the catalytic proton transport membrane consists essentially of the 2D material with the catalytic material disposed on the top surface (e.g., wherein the first proton conducting polymer layer and/or second proton conducting polymer layer are absent), then the compound can be present proximate the bottom surface of the 2D material. For example, the 2D material can shield the catalytic material from direct contact with the compound, but remote catalysis can still occur. For example, the 2D material can shield the catalytic material from direct contact with a compound, but remote catalysis can still occur allowing the compound to dissociate, wherein at least one product of the dissociation includes protons which can pass through the 2D material. A schematic illustration of the remote catalysis design is shown, for example, in FIG. 23.

Remote catalysis and/or proton transport through the catalytic proton transport membranes and/or the catalytic transport devices described herein can be controlled by a variety of factors. For example, remote catalysis and/or proton transport through the catalytic proton transport membranes can be controlled by the average thickness of the membrane, the average thickness of the 2D material, the identity of the 2D material, the presence or absence of pore(s) and/or defect(s) in the 2D material, the amount of catalytic material deposited on the top surface of the membrane, the configuration of the catalytic material, the identity of the catalytic material, the presence or absence of the first proton conducting polymer layer, the identity of the first proton conducting polymer, the average thickness of the first proton conducting polymer layer, the presence or absence of the second proton conducting polymer layer, the identity of the second proton conducting polymer, the average thickness of the second proton conducting polymer layer, a potential applied to the membrane, or a combination thereof. In some examples, the average thickness of the membrane, the average thickness of the 2D material, the identity of the 2D material, the presence or absence of pore(s) and/or defect(s) in the 2D material, the amount of catalytic material deposited on the top surface of the membrane, the configuration of the catalytic material, the identity of the catalytic material, the presence or absence of the first proton conducting polymer layer, the identity of the first proton conducting polymer, the average thickness of the first proton conducting polymer layer, the presence or absence of the second proton conducting polymer layer, the identity of the second proton conducting polymer, the average thickness of the second proton conducting polymer layer, a potential applied to the membrane, or a combination thereof can be selected in view of the desired remote catalysis and/or proton transport properties of the catalytic transport membranes and/or in view of the desired use of the catalytic proton transport membranes.

Also disclosed herein are methods of use of the catalytic proton transport membranes or the catalytic proton transport devices disclosed herein, the method comprising using catalytic proton transport membrane or catalytic proton transport device for catalytic hydrogen gas dissociation, deuterium gas dissociation, tritium gas dissociation, or a combination thereof.

The examples below are intended to further illustrate certain aspects of the systems and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of measurement conditions, e.g., component concentrations, temperatures, pressures and other measurement ranges and conditions that can be used to optimize the described process.

Example 1

In 2008 Bunch et al. measured negligible leakage rates for helium and other gases through micron scale mechanically exfoliated monolayer graphene (Bunch et al. *Nano Lett*, 2008, 8, 2458-2462). These experiments demonstrated the impermeability of the 2D lattice to even small gas atoms. The gas impermeability raised fundamentally important scientific questions regarding the transport of protons, since electrons have been shown to readily tunnel through the 2D lattice of monolayer graphene and h-BN.

In 2014, Hu et al. demonstrated electric-field-driven transport of protons through monolayer graphene and h-BN sandwiched between Nafion (Hu et al. Nature, 2014, 516, 227-230), a polymer capable of conducting protons in the hydrated state. The current obtained provided a measure of proton transport, since Nafion does not conduct electrons (Hu et al. Nature, 2014, 516, 227-230). The areal proton conductivity of graphene was ~3 mS cm$^{-2}$ and h-BN was ~100 mS cm$^{-2}$. The difference in conductivity was attributed to the polar nature of bonds in h-BN which results in the valence electrons concentrating around the N atom, leading to larger pores in the electron density distribution of h-BN compared to graphene (Hu et al. Nature, 2014, 516, 227-230). The measured decrease in areal proton conductivity with increasing number of layers supported the hypothesis of proton transport through pores in the electron cloud, e.g. bilayer graphene was almost impermeable to protons and bilayer, tri-layer h-BN showed proton conductivities ~3 mS cm$^{-2}$ and ~0.1 mS cm$^{-2}$, respectively. The differences between bilayer graphene and bilayer h-BN were attributed to layer stacking, i.e. the AA' stacking in h-BN aligns all hexagonal rings across multiple layers leading to the preservation of pores in the electron cloud and the AB stacking in graphene aligns the C atom in one layer with the center of the hexagonal ring in the next layer, effectively blocking the pore/gap in the electron cloud (Hu et al. Nature, 2014, 516, 227-230). Further, the areal conductivity of protons was also found to increase exponentially with an Arrhenius dependence on temperature for graphene (~60 mS cm$^{-2}$ at 60° C.) and h-BN (~600 mS cm$^{-2}$ at 60° C.), indicating that thermal processes dominate transport at higher temperatures (Hu et al. Nature, 2014, 516, 227-230). The associated energy barriers for proton transport are ~0.8 eV for graphene and ~0.3 eV for h-BN (Hu et al. Nature, 2014, 516, 227-230).

Hu et al. also measured liquid-phase areal proton conductivities ~3 mS cm$^2$ for graphene and ~100 mS cm$^{-2}$ for h-BN using suspended monolayer membranes, which is in good agreement with their own results from the Nafion-graphene-Nafion devices (Hu et al. Nature, 2014, 516, 227-230). While the liquid-phase experiments allowed for a direct measure of areal conductivity of protons, some studies have suggested that proton transport in the liquid-phase occurs via atomic defects in the 2D lattice. Further, Hu et al. showed that proton conductivity of graphene and h-BN could be increased by more than an order of magnitude to ~90 mS cm$^{-2}$ and ~2.5 S cm$^{-2}$, respectively, via the deposition of a discontinuous Pt layer (Pd, Ni, and Au were also tested) on the 2D lattice (Hu et al. Nature, 2014, 516, 227-230; Lozada-Hidalgo et al. Science, 2016, 351(6268), 68-70). While the exact mechanisms of enhanced proton transport in the Nafion-graphene-Pt devices remain largely unknown, the attraction of transient protons to Pt has been suggested to play a role. Notably, the energy barrier for proton transport through graphene was reduced by up to ~0.5 eV via Pt deposition. Lozada-Hidalgo et al. measured an exponential increase in proton conductivity for monolayer graphene (~20 S cm$^{-2}$), upon illuminating the Nafion-graphene-Pt devices with visible light (Lozada-Hidalgo et al. Nature Nanotechnology, 2018, 13, 300-303). Notably, the photo-responsivity ~$10^4$ AW$^{-1}$ (gain of ~$10^4$ protons per photon) and response times in the microsecond range were found to be competitive with state-of-the-art photodetectors.

In addition to proton transport, Lozada-Hidalgo et al. also reported hydrogen isotope separation through monolayer graphene and h-BN (Lozada-Hidalgo et al. Science, 2016, 351(6268), 68-70). Using Nafion-2D material-Nafion devices, they reported separation factor ~10 (10 protons:1 deuteron) for mechanically exfoliated graphene as well as h-BN, which was attributed to the difference in energy barrier of ~60 meV, originating from the difference in zero-point energy of protons and deuterons moving from Nafion through the 2D lattice (Lozada-Hidalgo et al. Science, 2016, 351(6268), 68-70). Bukola et al. also used Nafion-graphene-Nafion devices to measure proton and deuteron transport at different temperatures 30-60° C. and obtained activation energies for protons (0.50±0.02 eV) and deuterons (0.55±0.05 eV) transport through graphene (Bukola et al. JACS, 2018, 140, 1743-1752). The difference in activation energy for proton and deuteron transport agreed with the difference in zero-point energies for the O—H and O—D bonds formed with the SO$_3^-$ groups in Nafion (Bukola et al. JACS, 2018, 140, 1743-1752).

Interestingly, Bukola et al. measured record high proton conductivity ~29 S cm$^{-2}$ for graphene synthesized via chemical vapor deposition (CVD) by using Nafion-graphene-Nafion devices under high current density (Bukola et al. JACS, 2018, 140(5), 1743-1752). Further, Bukola et al. also reported negligible transport of K$^+$ compared to proton in the Nafion-graphene-Nafion devices (Bukola et al. JACS, 2018, 140(5), 1743-1752). These observations indicate that:

a) the record high proton conductance measured could not be attributed to defects in CVD graphene alone (since K$^+$ transport was negligible) and b) the device configuration/interfacing of the 2D material strongly influences the measured proton conductivity. However, proton transport through atomic defects and pentagon-heptagon rings along domain boundaries in CVD graphene that do not permit K$^+$ transport cannot be completely ruled out. In the same study, Bukola et al. also reported isotope separation factors ~14 (14 proton:1 deuteron) for CVD graphene (Bukola et al. JACS, 2018, 140(5), 1743-1752) which is in good agreement with the separation factor ~10 (10 protons:1 deuteron) for graphene reported by Lozada-Hidalgo et al. (Lozada-Hidalgo et al. Science, 2016, 351(6268), 68-70) but with proton conductivity values of only ~3 mS cm$^{-2}$.

While the above mentioned experimental studies convincingly demonstrated proton transport through graphene and h-BN, the measured proton conductivity values vary by up to 4 and 2 orders of magnitude, respectively; indicating the lack of a comprehensive understanding of transport mechanisms. Further, it remains unclear if the proton transport mechanism for h-BN is similar to graphene or inherently different. Commercially available 50 μm thick proton transport membranes (Nafion 212) used for fuel cell applications typically exhibit proton conductivity ~12 S cm$^{-2}$, while Bukola et al. measured proton conductivity ~29 S cm$^{-2}$ for monolayer CVD graphene (Bukola et al. JACS, 2018, 140 (5), 1743-1752). These observations have propelled interest in graphene and h-BN as proton permeable atomically thin membranes capable of operating in i) dry conditions (unlike Nafion) and ii) high temperatures for applications including fuel cells, isotope separation, hydrogen purification, photodetectors, and membrane electrodes. Realizing such technological advances, however, hinges on the development of a detailed fundamental understanding of the mechanisms governing proton transport through the atomically thin 2D material lattice.

Theoretical studies on transport through the graphene lattice typically indicate prohibitively large energy barriers 2.86 eV or 4.2 eV for hydrogen atoms. Miao et al. reported path-dependent energy barriers for proton transport through the graphene lattice, i.e. 1.41 eV for transport via a straight perpendicular path through the center of the hexagonal ring in the lattice and 2.21 eV for a path in close proximity to two carbon atoms in the hexagonal ring via chemisorption/bond formation (Miao et al. Physical Chemistry Chemical Physics, 2013, 15, 16132-16137). These energy barriers are far from the experimentally measured values of ~0.8 eV by Hu et al. (Hu et al. Nature, 2014, 516, 227-230) which suggested proton transport through pores in the electron cloud of 2D materials. However, most theoretical studies simply remove an electron from the supercell and interpret it to correspond to proton transport through the graphene lattice instead of hydrogen atom. Hence, an alternative interpretation could well be that the removal of electrons from the supercell dopes graphene p-type which leads to a reduced energy barrier ~1.41 or 2.2 eV for path-dependent hydrogen atom transport. Further, Nafion is known to dope graphene p-type and has been used to contact graphene in most proton transport experiments. Poltaysky et al. showed that inclusion of quantum effects such as tunneling and zero-point energy can further reduce the energy barrier by ~0.5 eV (Poltaysky et al. J Chem Phys, 2018, 148, 204707). Starting with the theoretical energy barriers ~1.4-2.2 eV, a further reduction by ~0.5 eV brings the theoretical values close to the measured value ~0.8 eV (Hu et al. Nature, 2014, 516, 227-230).

Since most experimental studies on proton transport have used hydrated Nafion or aqueous solutions, Feng et al. performed theoretical studies on protons transport through graphene with and without adsorbed water (Feng et al. J Phys Chem Lett, 2017, 8(24), 6009-6014). Feng et al. found that hydrogenation of graphene reduced the energy barrier from >3 eV to <1 eV for a path through the center of the hexagonal ring (Feng et al. J Phys Chem Lett, 2017, 8(24), 6009-6014). Feng et al. suggested that hydrogenation of the graphene lattice destabilizes the initial state (a deep-lying chemisorption state) and expands the 2D honeycomb lattice through which the protons penetrate (Feng et al. J Phys Chem Lett, 2017, 8(24), 6009-6014). The energy barrier was further reduced for disordered configurations (Feng et al. J Phys Chem Lett, 2017, 8(24), 6009-6014). Bartolomei et al. also reported energy barriers ~1 eV for proton transport through hydrogenated graphene (Bartolomei et al. Carbon, 2019, 144, 724-730). Interestingly, they suggested a cooperative mechanism where nearby chemisorbed protons facilitate incident protons to first chemisorb onto a carbon atom in the hexagonal ring (Bartolomei et al. Carbon, 2019, 144, 724-730). Next, bond flipping allows proton transfer to the other side of graphene via insertion in the middle of the C—C bond in the hexagonal ring (Bartolomei et al. Carbon, 2019, 144, 724-730). Taken together the theoretical results appear to suggest two distinct mechanisms for proton transport with and without hydrogenation of the graphene lattice and a comprehensive understanding remains elusive.

Research Plan and Methods

An objective of the research program described herein is to develop a detailed fundamental understanding of the mechanisms governing proton transport through atomically thin 2D materials. Here, proton transport through atomically thin graphene and h-BN membranes is experimentally studied in detail using in-situ X-ray photoelectron spectroscopy (XPS) (Thrust 1). The fundamental insights obtained from these experiments can be used to develop technological breakthroughs for catalysis (Thrust 2) and to modulate hydrogen isotope separations (Thrust 3).

Thrust 1: Elucidating Mechanisms of Proton Transport Through Atomically Thin 2D Materials Observing changes in the chemical bonding environment of the elements comprising the 2D lattice during proton transport can offer detailed insights into the mechanisms of transport.

Herein, in-situ XPS is used to probe proton transport through atomically thin graphene and h-BN in real-time to answer the following fundamental questions: i) What is the primary mechanism of proton transport through graphene? (considering the many different mechanisms proposed by theoretical studies e.g. chemisorption of protons on graphene, hydrogenation of graphene, transport through the C—C bond in graphene, doping of graphene, transport pathways through the center of the hexagonal ring etc.), and ii) Are the mechanisms of proton transport through h-BN similar or different to graphene?

Subtask-1—High-quality monolayer graphene and h-BN synthesis: Prior advances in 2D material synthesis, including in-situ observations during CVD of graphene and h-BN, and expertise in fabricating atomically thin membranes are leveraged to synthesize and transfer: i) high-quality single crystalline monolayer domains and ii) continuous monolayer films of graphene and h-BN on to custom-built devices (Subtask 2) and enable in-situ XPS measurements during proton transport through the 2D lattice (Subtask 3). High-quality single crystalline domains are expected to be free from domain boundaries and associated defects typically found in continuous polycrystalline films. Hence, single crystalline domains can be used to elucidate proton transport mechanisms in Thrust 1. Additionally, mechanically exfoliated monolayer flakes of graphene and h-BN can be used as controls to rule out effects from intrinsic vacancy defects in single crystalline domains.

For CVD growth of monolayer graphene or h-BN, Cu foil (18-25 μm thick, ~99.9% purity) is cleaned via sonication in 15% nitric acid to remove surface oxides and other contaminants. Similarly, Fe foil (100-125 μm thick, ~99.9% purity) cleaned in 0.1 M $FeCl_3$ is used specifically for large single crystalline h-BN domain growth. The cleaned foils are rinsed in de-ionized water and dried. The dried foil is loaded into a custom-built hot-walled CVD reactor, heated to ~1050° C. under $H_2$ atmosphere at low pressure conditions and annealed for 60 min at ~1050° C. in a $H_2$ to allow for grain growth within the foil. Post annealing, $CH_4$ is introduced into the reactor in the presence of $H_2$ to nucleate and grow graphene. In the case of h-BN, the boron and nitrogen precursors are introduced by subliming ammonia borane or by using borazine with $H_2$ as the carrier gas. Control over the precursor dosage, $H_2$ flow rate, and CVD process time allows for the synthesis of high-quality single crystalline monolayer graphene and h-BN domains, as well as high-quality continuous but polycrystalline monolayer films. The synthesized graphene and h-BN can be characterized using scanning electron microscopy (SEM) and optical microscopy for film coverage and uniformity and using Raman spectroscopy for film quality. Results have demonstrated successful synthesis of high-quality single crystalline monolayer graphene and h-BN domains as well as continuous films.

Subtask 2—device fabrication to probe proton transport through graphene and h-BN: Two different types of devices (FIG. 1-FIG. 8) are used to measure in-situ XPS during proton transport through graphene and h-BN: i) Nafion-2D material devices and ii) liquid-phase proton transport devices with free-standing 2D material membranes. While the Nafion-2D material devices enable a direct comparison with the device configuration commonly used to demonstrate proton transport in the literature, the liquid-phase proton transport devices with free-standing membranes allow for clear and unambiguous interpretation of XPS results without any convoluting effects from Nafion.

Fabrication of these devices starts with commercially available Si wafers coated with ~500 nm of silicon nitride ($SiN_x$) and a combination of reactive ion etch (RIE, to etch the $SiN_x$) and KOH etch (to etch Si) are used to prepare a free-standing $SiN_x$ membrane (FIG. 1). An RIE etch of this free-standing $SiN_x$ membrane is performed to form a ~5 μm aperture in the center of a ~1 cm×1 cm wafer area (FIG. 1). Other aperture dimensions can be readily fabricated if required to enable measurements over larger or smaller areas. Au contacts are deposited on the devices via lithography followed by thermal or e-beam evaporation to allow for electrical contacts to probe proton transport. Next, high quality single crystalline domains of monolayer graphene or h-BN synthesized via CVD (see Subtask 1) are transferred on to the device (FIG. 2) such that the domains fully cover the ~5 μm aperture and extends over to the Au contacts. Well-developed polymer-free transfer methods are used to minimize contamination of the 2D material surface, followed by annealing at ~120° C. in 5% $H_2$ in Ar for 24 hours. The annealing helps remove adventitious carbon from the surface along with any water from the interface, promoting better adhesion of the 2D material to the $SiN_x$ surface. The transferred 2D materials can be thoroughly characterized using high resolution SEM for macroscopic film uniformity and to ensure no tears or cracks exist in the suspended region of the membranes. Atomic resolution scanning transmission electron microscopy (STEM) can be performed to ensure the absence of nanoscale defects within the suspended regions of the single crystalline monolayer graphene or h-BN domains. If required, atomic layer deposition (ALD) of $HfO_2$ can be used to seal intrinsic nanoscale defects in the high-quality single crystalline graphene or h-BN domains. The high surface energy of defects allows preferentially nucleation of oxide nanoparticles during ALD of <0.5 nm thick films. Finally, mechanically exfoliated monolayer graphene and h-BN can be used in control devices to rule out any effects arising from intrinsic defects.

Figure 3:
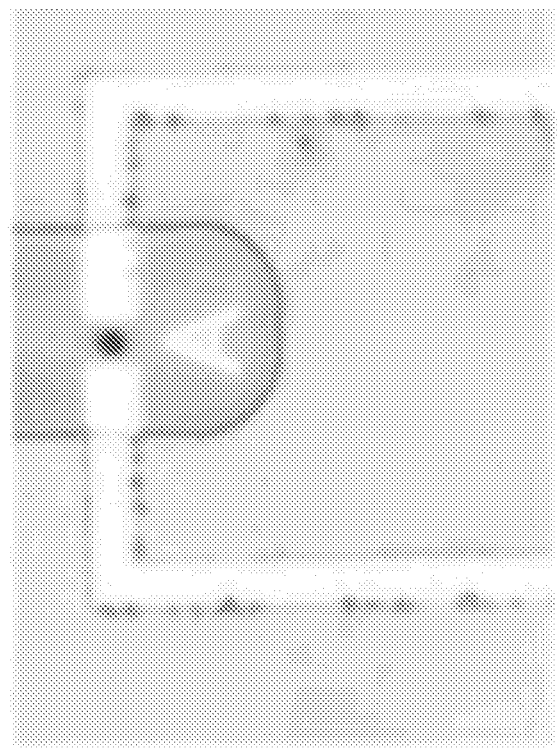
FIG. 3. Optical microscopy image of the aperture and Au contacts.
Figure 4:
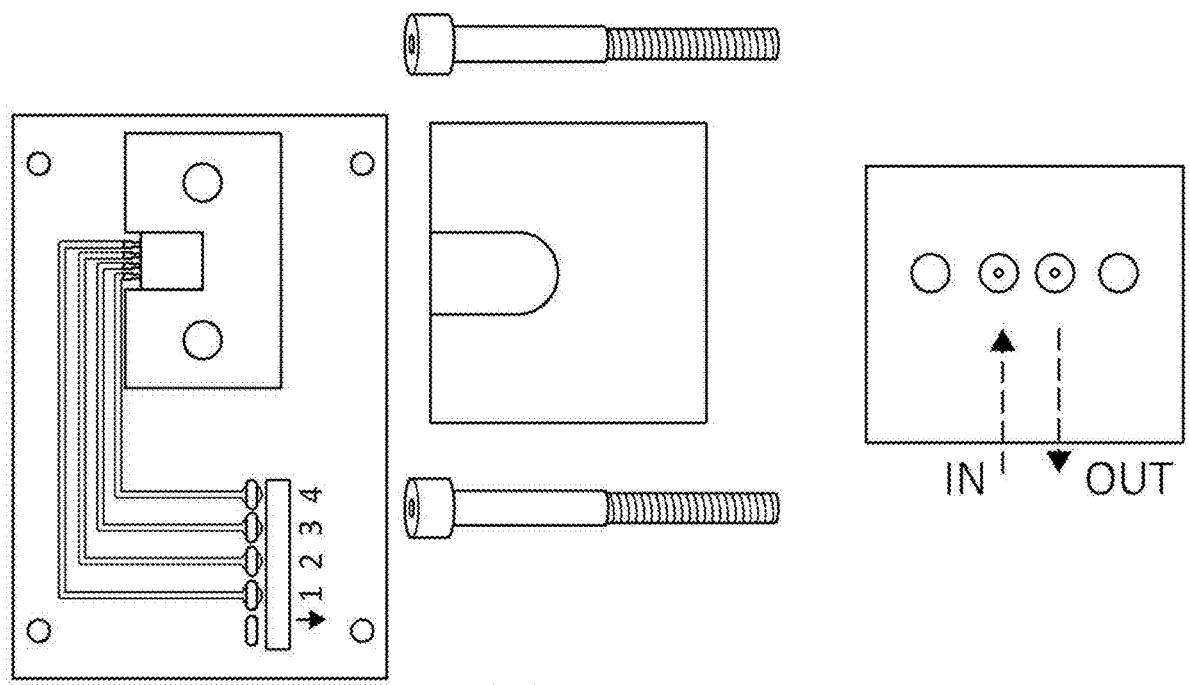
FIG. 4. Photographs of experimental set-up to integrate the chip into the in-situ XPS chamber, with electrical connections and flow cell for gas/liquid (white block) with inlet and outlet ports (smaller holes in side view). Larger holes are for bolts.
Figure 5:
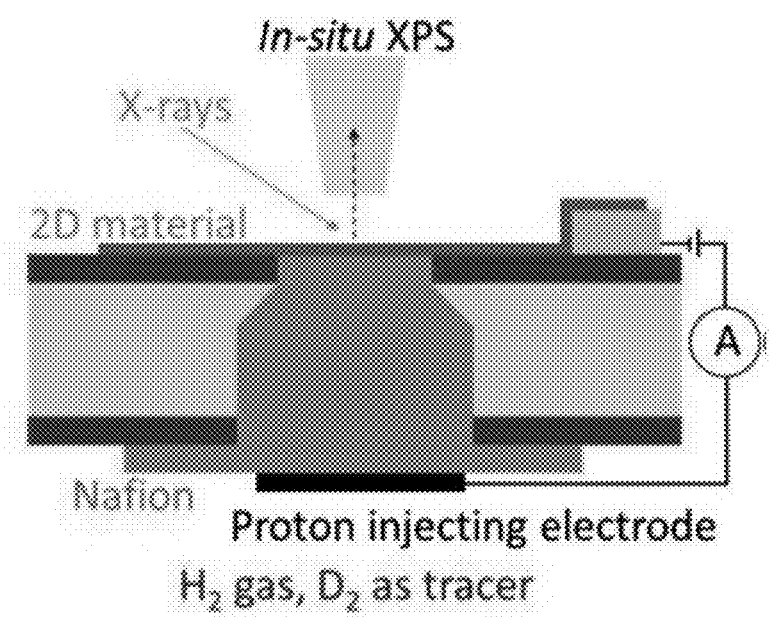
FIG. 5. In-situ XPS during proton transport through atomically thin graphene or h-BN membranes using Nafion-2D material devices.
Figure 6:
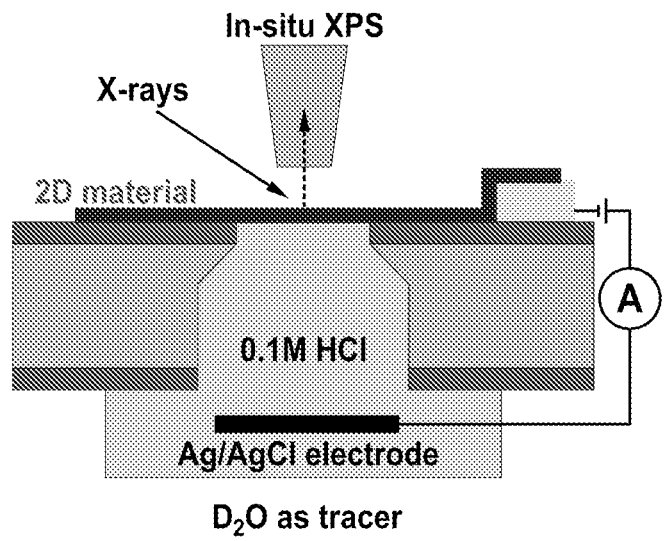
FIG. 6. In-situ XPS during proton transport through atomically thin graphene or h-BN membranes using liquid-phase proton transport devices.
Figure 7:
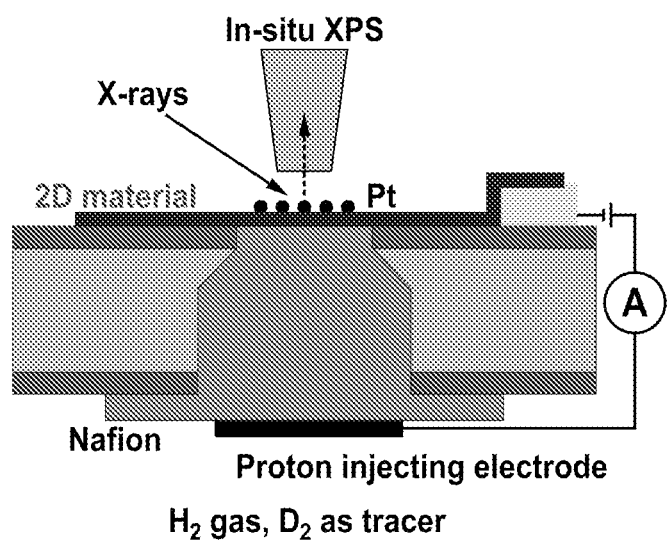
FIG. 7. Probing the influence of Pt deposition on proton transport through atomically thin 2D material membranes using Nafion-2D material devices. The flow cell design allows for the injecting Deuterium ($D_2$) or heavy water ($D_2O$) as a tracer during proton transport experiments.
Figure 8:
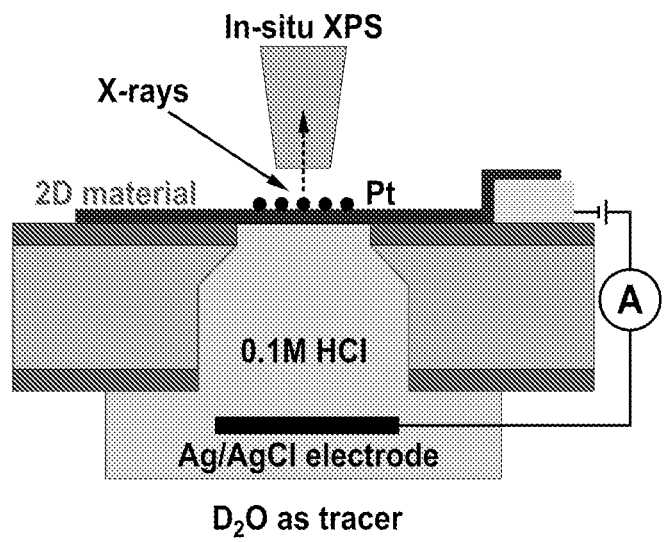
FIG. 8. Probing the influence of Pt deposition on proton transport through atomically thin 2D material membranes using liquid-phase proton transport devices. The flow cell design allows for the injecting Deuterium ($D_2$) or DCl in heavy water ($D_2O$) as a tracer during proton transport experiments.

For Nafion-2D material devices (FIG. 5), the 2D material suspended over the ~5 μm aperture on is be coated with 5% Nafion from the back side and carbon electrodes with platinum black catalyst (0.2-1 $mg/cm^2$ or 20-25 wt %) are attached as proton injecting electrodes. The devices are electrically contacted and sealed on top of a custom-built flow cell with inlet and outlet ports (FIG. 4, small holes in side view) to allow for the flow of humidified hydrogen gas. The application of a suitable bias causes the hydrogen to dissociate on the Pt loaded carbon electrode forming protons that will be pumped into the hydrated Nafion layer and proceed to transport through the graphene or h-BN lattice. For the liquid-phase proton transport devices (FIG. 6), the 2D material is electrically contacted and sealed on top of the flow cell. The flow cell is filled with 0.1 M HCl solution (FIG. 6) and Ag/AgCl electrodes are introduced. The application of a bias pumps protons from the solution through the atomically thin graphene or h-BN lattice. Notably, the design of the flow cells allows for injecting Deuterium ($D_2$) or heavy water ($D_2O$) as a tracer during proton transport experiments with the Nafion-2D material and liquid-phase proton transport devices, respectively (see Subtask 3). Further, the evaporation of ~1 nm of Pt on the 2D material leads to the formation of nanoparticles on the surface and readily allows for experiments probing the influence of Pt on proton transport through graphene and h-BN (FIG. 7, FIG. 8). Preliminary experiments confirmed the feasibility of the device design (FIG. 3-FIG. 4).

Subtask 3—In-situ XPS during proton transport and the use of deuterons as tracer: Using the devices fabricated in Subtask 2, the chemical bonding environment of the constituent elements of the 2D lattice during proton transport can be systematically studied and thus shed light on the transport mechanisms. First, the devices (FIG. 5, FIG. 6) are loaded into the ambient pressure in-situ XPS chamber. Next, electric contacts are made to the devices (FIG. 4) after connecting the $H_2$ gas supply for the Nafion-2D material device (FIG. 5) or slowly filling the liquid-phase proton transport device with 0.1 M HCl (FIG. 6). The liquid-phase devices with free-standing membranes can allow for clear and unambiguous interpretation of XPS results without any convoluting effects (Subtask 2). The C1s peak in the XPS spectra measured on graphene membranes covering a liquid indeed demonstrates the feasibility of the devices and approach.

The application of a bias between the electrodes of the device provides an electrical gradient for protons to pump through the device, transport through the graphene or h-BN membrane and evolve as $H_2$ gas that can be detected via a mass spectrometer connected to the in-situ XPS chamber on the other side of the graphene or h-BN membrane, i.e. the side from which incident X-rays reach the device (FIG. 5-FIG. 8). The current is measured as a function of applied bias in the devices in addition to probing the surface of the 2D material with in-situ XPS. Specifically, changes are monitored in the C1s core level spectra for graphene and the B1s and N1s spectra for h-BN, respectively, during proton transport through the graphene and h-BN lattice for varying times from 1 min to 24 hours.

Monitoring the shape and positional shifts in the C1s peak for the $sp^2$ bonds in graphene ~284.4 eV (binding energy) during proton transport offers fundamental insights on whether proton transport through graphene proceeds via chemisorption of H on the C atoms in graphene, hydrogenation of graphene ($sp^3$ bonds appear as a characteristic shoulder on the C1s peak), or via doping of the graphene. Additionally, near edge X-ray absorption fine structure (NEXAFS) spectra can be acquired to clearly resolve hydrogenation of graphene. Hence, these experiments can provide direct evidence regarding proton transport through the C—C bond in the graphene lattice via hydrogenation or chemisorption.

Similarly, observing the B1s and N1s core level XPS spectra and NEXAFS spectra during proton transport through h-BN reveals similarities or differences in the mechanisms with respect to graphene including hydrogenation of h-BN. Also, turning off the devices and measuring XPS probes if there any difference in the core level spectra in an effort to understand whether the changes to the constituent elements of the 2D material due to proton transport are transient, reversible, or permanent in nature. If changes are indeed detected, the devices can be operated in cyclical mode and these changes can be probed further to understand the origin of the transient behavior. For devices with ~1 nm Pt layer (FIG. 7, FIG. 8), the Pt 4d core level XPS spectra (in addition to XPS spectra of the 2D material elements) can also be monitored to develop a fundamental understanding of the enhancement in proton transport through the 2D lattice via Pt deposition that has been attributed to the attraction of transient protons to Pt. Further, the influence of other metals, e.g. Pd, can also be probed and compared with Pt. In case higher photon flux or brilliance is required for refining finer feature differences in the core level spectra, a synchrotron source based time-resolved in-situ XPS can be used.

Finally, $D_2$ and $D_2O$ are injected as a tracers for the Nafion-2D material and liquid-phase proton transport devices, respectively, and the substitution of the C—H bonds with C-D bonds is monitored using ex-situ Raman and infrared spectroscopy. These experiments can indicate whether any changes to the chemical bonding environment of the constituent elements are indeed from the injected deuterons during the experiment and not from other artifacts and/or prior processing.

Thrust 2: Atomically Thin Barriers with Catalytic Transparency and Selective Proton Transport The lattice transparency and selective proton transport capability of 2D materials can enable catalytic dissociation of $H_2$, while ensuring physical separation via an atomically thin barrier.

Figure 2:
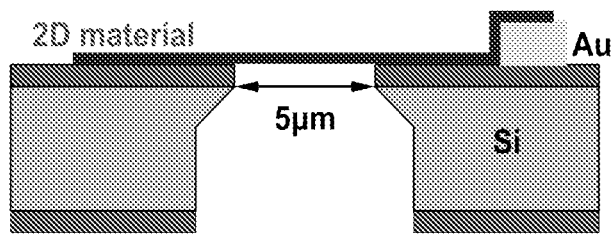
FIG. 2. Polymer-free transfer of monolayer graphene or h-BN on the 5 μm aperture and Au contacts.
Figure 9:
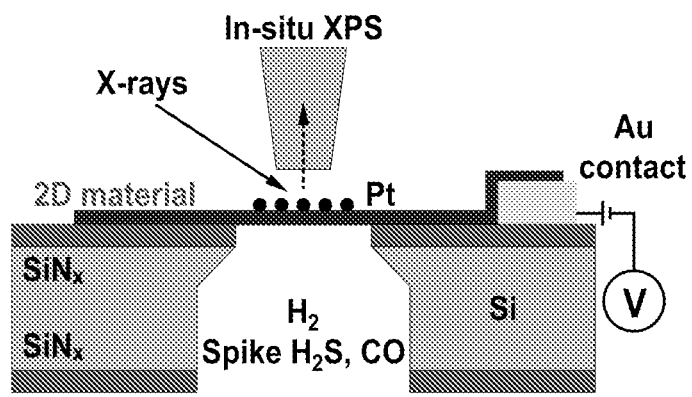
FIG. 9. Schematic of a suspended 2D membrane device used to probe catalytic dissociation of $H_2$ via Pt catalyst deposited on the other side.
Figure 10:
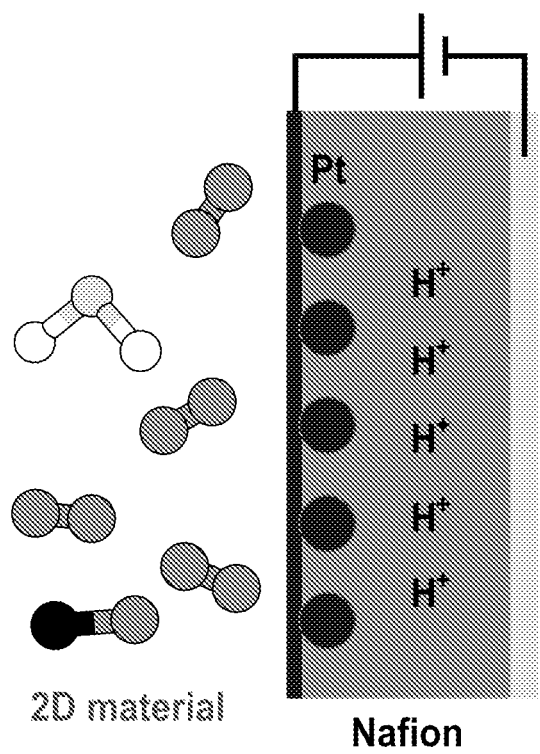
FIG. 10. Schematic of a 2D material-Pt-Nafion proton pump device devices used to probe catalytic dissociation of $H_2$ via Pt catalyst deposited on the other side.

Herein, the fundamental insights on proton transport through 2D materials obtained in Thrust 1 are built upon and catalytic dissociation of $H_2$ on one side of the 2D material via Pt catalyst deposited on the other side is explored (FIG. 9, FIG. 10). Specifically, the lattice transparency of graphene and h-BN can be exploited to allow for catalytic interactions through an atomically thin barrier for gases. The lattice transparency (chemical and/or electronic interactions between materials separated by the 2D lattice as though the lattice were transparent) of graphene has been shown to allow for remote-epitaxy effects up to length scales of ~1 nm but the thickness of the atomically thin 2D materials used herein is ~0.34 nm. Further, prior work including detailed in-situ observations has shown that a catalyst covered with monolayer graphene or h-BN can still exhibit catalytic activity that results in the growth of multiple layers of the 2D material (FIG. 1, FIG. 2). Finally, Hu et al. indeed reported enhanced proton transport through the 2D material when Pt was deposited on the other side and suggested the attraction of transient protons to Pt to play a role (Hu et al. Nature, 2014, 516, 227-230).

The devices fabricated in Subtask 2 with the 2D material membrane suspended on the ~5 μm aperture can be used with ~1 nm Pt deposited thereon via e-beam evaporation (FIG. 9). The devices are mounted into the in-situ XPS chamber, electrical contacts are formed, and the $H_2$ gas supply is connected (FIG. 9). A mass spectrometer monitors the gas environment on the Pt side of the monolayer graphene or h-BN membrane, i.e. the side from which incident X-rays reach the device (FIG. 9). Only when the device is biased is $H_2$ expected to dissociate due to the lattice transparency of the 2D material and proximity to Pt catalyst, transport through the 2D material as protons, and re-combine to form $H_2$ on the other side. In-situ XPS is measured and used to monitor the C1s core level spectra for graphene, the B1s, N1s core level spectra for h-BN, and the Pt 4d core levels when a bias is applied to the device. While the XPS spectra provides information on the chemical binding environment of the 2D material and the Pt catalyst, the mass spectrometer helps detect whether any $H_2$ is formed via the re-combination of protons indicating transport through the 2D materials and hence, dissociation of the $H_2$ by Pt via lattice transparency. Further, the $H_2$ can be spiked with $H_2S$ and CO to observe how these molecules interact with the Pt catalyst when separated by an atomically thin physical barrier. $H_2S$ and CO are well-known to react with the Pt, leading to deactivation or poisoning of the catalyst, necessitating very high purity $H_2$ in applications such as fuel cells. Most sources of scalable hydrogen production results in trace contamination by $H_2S$ and CO, requiring cost and energy intensive purification with the final goal of preserving the Pt catalyst in fuel cells.

The ability to protect the Pt catalyst surface while still achieving $H_2$ dissociation via "remote-catalysis" offers transformative advances for many hydrogen technologies by potentially allowing the use of impure hydrogen. 2D-material-Nafion-Pt hydrogen pump devices (FIG. 10) can be fabricated to probe dissociation of the $H_2$ by Pt via lattice transparency in a configuration that can be readily integrated into fuels cells. For these devices, ~1 nm of Pt is evaporated on high-quality monolayer 2D material films on the metal foil after growth via CVD. Next, ~1 cm×1 cm of the 2D material-Pt stack is transferred to a Nafion layer via hot-pressing at 140° C., followed by acid etch of the metal foil and multiple rinses in de-ionized water. A carbon cloth electrode with a Pt black catalyst is added to the Nafion side, the 2D material is contacted electrically (FIG. 10), and the 2D material side is exposed to $H_2$ gas while the Nafion side is exposed to humidified Ar. Current vs voltage characteristics are measured for these devices. Since no other charge carriers are present in the system, the obtained current is a direct measure of the dissociation of the $H_2$ by Pt via lattice transparency and subsequent transport through the atomically thin lattice. Successful demonstration of the device configuration in FIG. 10, taken together with prior advances with fabricating centimeter-scale atomically thin gas barriers and roll-to-roll manufacturing processes atomically thin membranes offers revolutionary opportunities for several hydrogen based technologies including fuel cells.

Thrust 3: Atomically Thin Membranes for Separation of Hydrogen Isotopes

The bonding chemistry of protons and deuterons to be incident on atomically thin membranes can be used to modulate isotope separations by exploiting the difference in zero-point energy.

Here, the fundamental insights on proton transport obtained in Thrust 1 are built on and hydrogen isotope separation using atomically thin membranes is explored. An answer to the fundamental scientific question on whether zero-point oscillations of chemical bonds, a purely quantum effect, can dominate transport properties of protons and deuterons through atomically thin membranes and allow for controllable isotope separation is sought. To test this, three different bonding chemistries for protons and deuterons are selected, i.e. O—H, N—H, and metal hydrides, as model material systems. Specifically, electrochemical proton/deuteron pumps (FIG. 11) with a) Nafion-2D material-Nafion (model system for O—H and O-D bonds), b) poly(imidazole)-2D material-poly(imidazole) (model system for N—H and N-D bonds), and c) Pd-2D material-Nafion (model system for Pd—H and Pd-D bonds) are used. The rationale for this choice is that, in a typical proton conducting polymer, transport occurs via proton hopping along the polymer chains with functional groups. Hence, protons (and deuterons) remain at least transiently bonded (e.g., O—H, N—H, Pd—H) to functional group in the polymer chains before they are incident on the 2D material membrane. The difference in incident energies between protons (EH) and deuterons (ED) arising from the different zero-point energies of these bonds can be exploited to enable separation via transport through atomically thin membranes.

Figure 11:
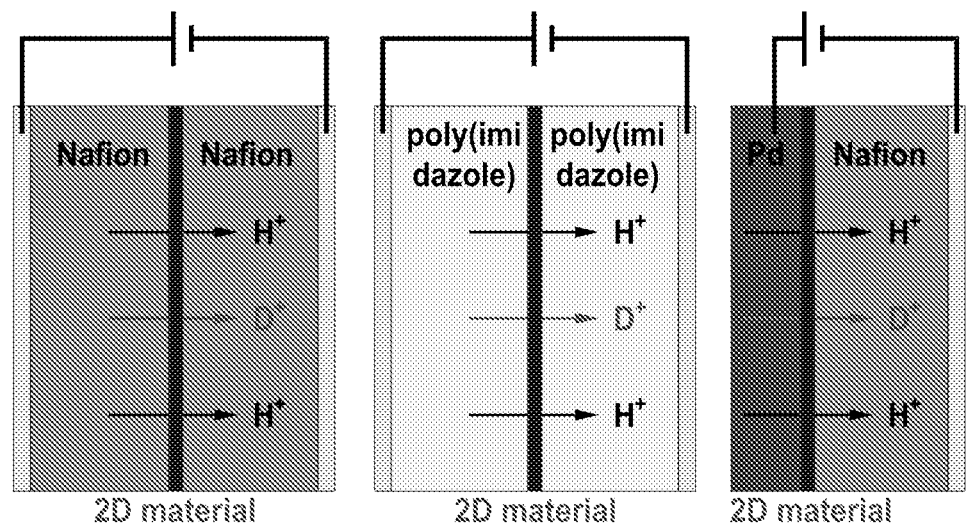
FIG. 11. Schematic of Nafion-2D material-Nafion, poly(imidazole)-2D material-poly(imidazole) and Pd-2D material-Nafion devices.
Figure 12:
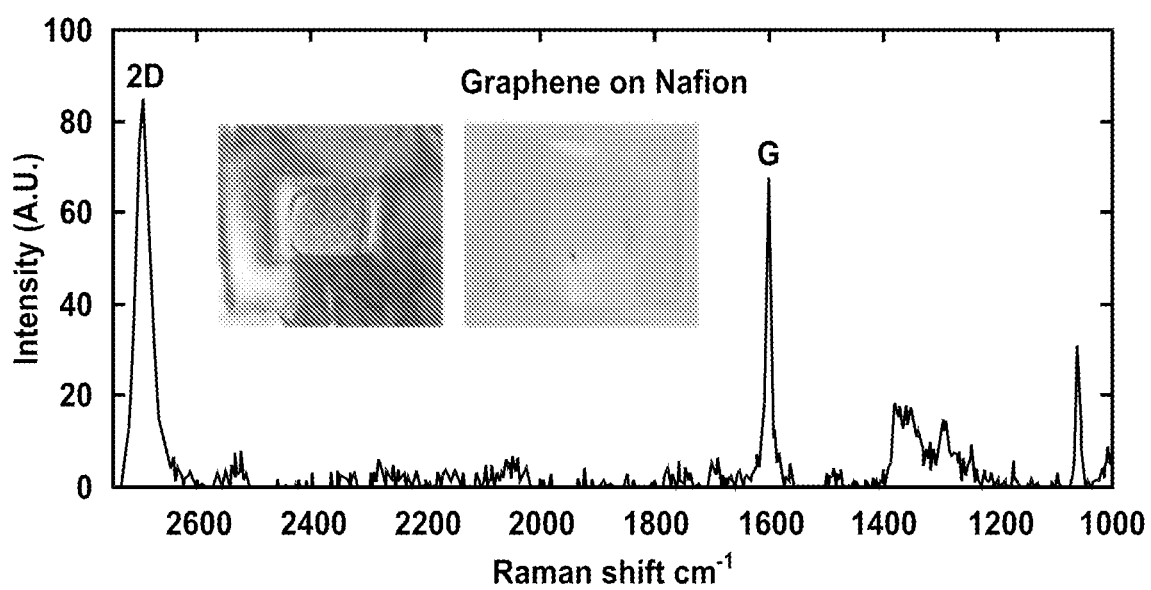
FIG. 12. Insets show Nafion film hot-pressed on CVD graphene on Cu foil and subsequent graphene transfer on Nafion Raman spectra confirms graphene transfer on Nafion.

Nafion-2D material-Nafion sandwich proton pump devices are fabricated via hot-pressing ~2 cm×2 cm Nafion layer (50 μm thick, Nafion 212) on a similarly sized continuous high-quality monolayer graphene or h-BN film on Cu at 140° C. (inset in FIG. 12). An acid etch dissolves the Cu foil and multiple rinses in de-ionized water removes acid residue and allows for clean transfer of the 2D material to Nafion (inset in FIG. 12). Raman spectroscopy can be used to confirm the transfer of the 2D material to Nafion (FIG. 12). Next, a second layer of Nafion (similar in properties to the 1st layer) is hot-pressed on the graphene to form a Nafion-2D material-Nafion sandwich (FIG. 11). Finally, ~1 cm diameter circles are punched out from this stack to avoid edges, carbon-cloth electrodes coated with 4 mg/cm$^2$ of Pt black are added on both sides, and a proton pump cell is formed (insets in FIG. 13). Similar procedures are used to fabricate poly(imidazole)-2D material-poly(imidazole) devices by substituting the Nafion layer with commercially available Celazole PBI layer. Pd-2D material-Nafion devices are fabricated via e-beam evaporation of ~20 nm thick film of Pd on the 2D material after transfer to Nafion as described above.

Figure 13:
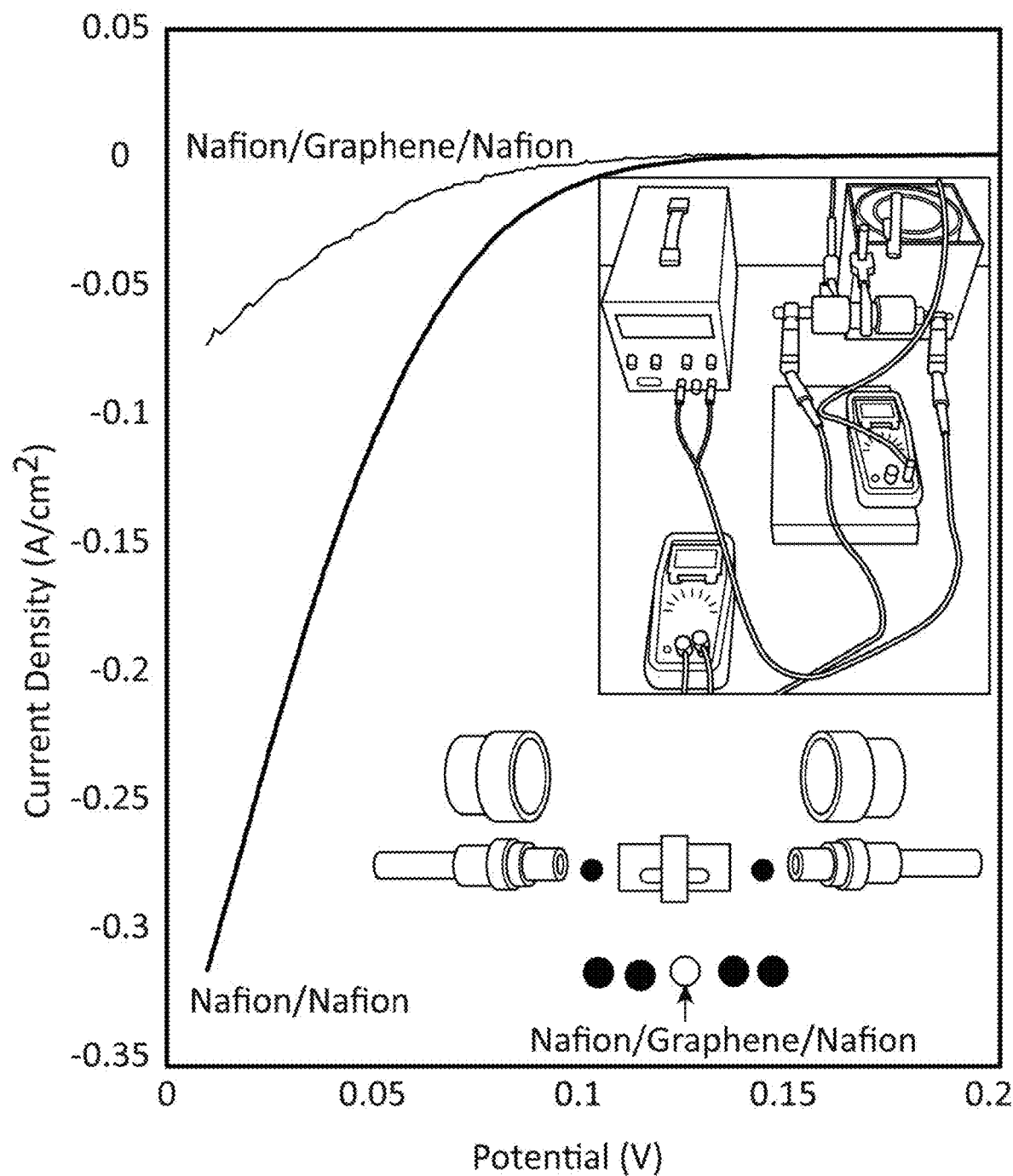
FIG. 13. Current density vs Voltage for protons in Nafion-graphene-Nafion devices. Insets show a custom-built test set-up with power source, electrodes and device components.

All fabricated devices are tested in a custom-built test rig (inset in FIG. 13) with sequential exposures to $H_2$, $D_2$ and $H_2+D_2$ mixtures after humidifying the gases with $H_2O$ or $D_2O$. I-V curves can be acquired using a potentiostat in linear sweep or cyclic voltammetry setting for a range of temperatures from 25-90° C. to 1) obtain activation energies from Arrhenius plots and 2) obtain separation factors a function of temperature. Preliminary results indicated the feasibility of fabricating and testing these proton pump cells (FIG. 12, FIG. 13).

At 25° C. proton-deuteron separation factors of ~10.6 can be expected in the Nafion-2D material-Nafion devices based on the difference in zero-point energy of O—H and O-D bonds in the sulfonated polymer chains. Similarly, proton-deuteron separation factors of ~8.5 can be expected in the poly(imidazole)-2D material-poly(imidazole) devices based on the difference between the N—H and N-D bonds in the poly(imidazole)-2D material-poly(imidazole) devices, and a separation factor of ~1-2 can be expected for the Pd-2D material-Nafion devices based on the Pt-H and Pt-D bonds. A decrease in separation factor can be observed with increasing temperature for each of the devices since thermal processes are expected to dominate over quantum effects (zero-point energy) at high temperatures. Taken together, the above mentioned experiments can test the hypothesis of modulating separation factors for proton-deuteron separation using atomically thin materials by changing the bonding chemistry of incident protons and deuterons. Additionally, the temperature dependence of separation factors in the devices can offer insights confirming or refuting the difference in zero-point energy as the mechanism causing proton-deuteron separation through atomically thin membranes. Current state-of-the-art technologies for processing isotopic mixtures of hydrogen for applications in medicine, research, industrial $D_2O$ production and environmental remediation are extremely energy intensive and atomically thin membranes can offer revolutionary advances. Finally, the poly(imidazole)-2D material-poly(imidazole) devices can also be tested under anhydrous conditions, since poly(imidazole) is capable of conducting protons in the anhydrous state. These experiments can also offer insights into developing ultra-thin anhydrous proton conducting membranes for advancing dry-fuel-cells capable of operating in temperatures up to ~200° C.

Example 2—Ultra-Thin Ceramic Sieves for Isotope and Deuterium-Helium Separations Two-dimensional (2D) materials such as graphene and hexagonal boron nitride (h-BN) present potential for breakthrough advances in sub-nanometer scale separations. The atomically thin pristine lattices of graphene and h-BN are impermeable small ions (e.g., $K^+$, $Cl^-$) as well as small gas atoms (e.g., Helium) [1], but allows for electrically-driven transport of thermal protons (H) and the heavier isotope deuterons (D). The measured transport rate of H is an order of magnitude higher than D, allowing for a rate based separation factor ~10 [2,3] for both graphene and h-BN. Interestingly, the areal proton conductivity of h-BN (~100 mS cm$^{-2}$) is significantly higher than graphene (~3 mS cm$^{-2}$), and monolayer h-BN is a ceramic with high temperature stability (>800° C. in air) [4], high mechanical strength [5], and excellent resistance to chemical degradation [6].

Selective H and D transport with very high transport rates through monolayer h-BN can potentially enable transformative advances in isotope separation [2,7,8], energy generation and conversion [9], gas purification [10], national security, and environmental remediation or de-contamination [2,7,8]. Further, monolayer h-BN membranes could enable the development of fundamentally new approaches for $D_2$-He separations important for fusion reactors as well as tritium-$^3$He separation of interest to the Department of Energy (DOE). Realizing these technological advances hinges on developing a fundamental understanding of H and D transport and $D_2$-He separations though monolayer h-BN.

The factors influencing H/D transport and $D_2$-He separations through monolayer h-BN membranes synthesized using scalable chemical vapor deposition (CVD) can be experimentally studied and elucidated. The research systematically explores hypothesis-driven experimental approaches to probe the influence of a) h-BN structure i.e. grain boundaries, and lattice defects on H/D transport and $D_2$-He separations, and b) develop approaches to efficiently maximize selectivity in large-area h-BN membranes. Outcomes of the proposed research can include i) knowledge on the development of atomically thin h-BN membranes, ii) fundamental insights into factors influencing isotope transport and $D_2$-He separations, and iii) approaches to increase isotope selectivity.

Background/Introduction: Isotopic mixtures of hydrogen (proton (H), deuteron (D), and tritium (T)) are processed in huge quantities (several thousand tons) every year for applications in medicine and therapeutics, pharmaceuticals, research on reaction mechanisms, industrial levels of heavy water ($D_2O$) production and tritium decontamination [2,7,8]. Current state-of-the-art technologies are a) extremely energy intensive, b) have limited selectivity—often needing hundreds of staged separations, and c) require materials that can operate in the presence of harsh chemicals that are detrimental to the environment [2,7,8]. While some processes, e.g. electrolysis, do provide high separation factors, the energy intensity renders the process un-economical. The development of isotope separation processes using electrochemical pumping of H and D through atomically thin h-BN membranes can offer transformational advances, i.e. reducing energy requirements by ~2 order of magnitude while maintaining high separation factors. Further, monolayer h-BN is a ceramic with high temperature stability (>800° C. in air) [4], high mechanical strength [5], and excellent resistance to chemical degradation [6].

Selective electrochemical pumping of H and D through atomically thin h-BN, while exploiting the impermeability of the 2D material lattice to small gas atoms such He can enable fundamentally new approaches to $D_2$-He separations important for fusion reactors [11]. $D_2$ and He have very similar atomic mass units (amu) and conventional separations by cryogenic processes are extremely energy intensive [11]. Fundamentally new approaches to $D_2$-He separations via electrochemical pumping through atomically thin h-BN membranes can also be of high relevance and extendable to T-$^3$He separations. $^3$He in particular finds applications in portable radiation monitors for national and border security (detecting illicit transport of radiological/nuclear materials) and concerns regarding the availability of $^3$He have been identified. Current state-of-the-art T-$^3$He separations processes are extremely energy intensive using i) selective absorption on to molecular sieves at cryogenic temperature or ii) oxidize the T in He mixtures to form tritiated water followed by separation of tritiated water from He. However, the oxidization of T in $^3$He mixtures to form tritiated water is accompanied by the risk of contaminating ground water around the plants despite extensive precautions [11]. Realizing these technological advances however, hinges on developing a fundamental understanding of H and D transport and $D_2$-He separations though h-BN.

In 2008 Bunch et al. [1] first demonstrated atomically thin membranes by using exfoliated flakes of graphene to cap micron scale cavities in $SiO_2$ filled with He and other gases. The negligible leakage rates measured indicated the impermeability of 2D graphene lattice to even small gas atoms. Since electrons readily tunnel through the 2D lattice of monolayer graphene [12] and h-BN [13], the impermeability to small gases such as He raised intriguing scientific questions on the transport of protons through the 2D lattice of graphene and h-BN [1-3].

Theoretical studies soon after predicted very large energy barriers ~2.86 eV (first principles calculations and harmonic transition state theory) [14] and ~4.2 eV (DFT calculations) [15] for proton transport through the graphene lattice. While some studies predicted slightly different values along with a decrease in barrier height with increasing temperatures, the overall activation energies for proton transport through the graphene lattice at ambient conditions remained prohibitively large >1.5 eV [14-22].

However, in 2014, Hu et al. [2] demonstrated significantly high electric-field-driven transport of thermal protons through single layer graphene (areal conductivity ~3 mS $cm^{-2}$) and h-BN (areal conductivity ~100 mS $cm^{-2}$) embedded between two Nafion layers [2,3]. The measured current in these devices represented a direct measure of proton transport, since Nafion is an ionomer capable of conducting protons only when hydrated, the de-hydrated state does not conduct electrons [2,3]. The difference in measured areal conductivities between graphene and h-BN was attributed to slightly larger pores in the electron density distribution of h-BN originating from the polar nature of bonds in h-BN that result in the valence electrons concentrating around the N atom [2,3]. Further, the areal proton conductivity decreased with increasing number of graphene or h-BN layers, i.e. bilayer graphene was almost impermeable to protons and bilayer, tri-layer h-BN showed proton conductivities ~3 mS $cm^{-2}$ and ~0.1 mS $cm^{-2}$, respectively [2]. These observations supported the hypothesis of proton transport through pores in the electron cloud in graphene and h-BN, and the differences between bilayer graphene and bilayer h-BN were attributed to layer stacking, i.e. AB stacking in graphene positions the C atom in one layer at the center of the hexagonal ring in the next layer, effectively blocking the pore/gap in the electron cloud, while the AA' stacking in h-BN aligns all hexagonal rings across multiple layers leading to the preservation of pores in the electron cloud even though the integrated electron density increases for multiple h-BN layers [2,3]. The areal conductivity of protons showed an Arrhenius dependence on temperature for graphene (~60 mS $cm^{-2}$ at 60° C., energy barriers ~0.8 eV) and h-BN (~600 mS $cm^{-2}$ at 60° C., energy barriers ~0.3 eV), indicating thermal processes dominated transport at with increasing temperatures [2,3].

Liquid-phase areal proton conductivities ~3 mS $cm^{-2}$ for graphene and ~100 mS $cm^{-2}$ for h-BN using suspended monolayer membranes showed good agreement with results from the Nafion-graphene-Nafion devices [2]. Although the liquid-phase experiments allowed for a direct measure of areal conductivity without convolutions from interfacing in Nafion in devices, some studies have suggested that liquid-phase proton transport occurs primarily via atomic defects in the 2D lattice [18,23].

Finally, Hu et al. [2] showed that proton conductivity could be increased by more than an order of magnitude for graphene (~90 mS $cm^{-2}$) and h-BN (~2.5 S $cm^{-2}$) and the barrier for transport reduced by ~0.5 eV via the deposition of a discontinuous Pt layer (Pd, Ni and Au layers were also tested) on the 2D lattice [2,3]. While the mechanisms behind the enhanced proton transmission in the Nafion-graphene-Pt devices remain unknown, the attraction of transient protons to Pt has been hypothesized to play a role. Illuminating the Nafion-graphene-Pt devices with visible light resulted in an exponential increase in proton conductivity for monolayer graphene (~20 S $cm^{-2}$) as shown in [10].

Interestingly, Lozada-Hidalgo et al. [8,24] measured transport rates for D through mechanically exfoliated flakes of graphene and h-BN embedded between Nafion layers and found to it to be an order of magnitude lower than H, allowing for a rate based separation factor ~10 (10 H:1 D). The difference in transport rates for H and D was attributed to the difference in energy barrier of ~60 meV, originating from the difference in zero-point energy of H and D moving from Nafion through the 2D lattice [8,24]. Bukola et al. [25] also used Nafion-graphene-Nafion devices to measure H and D transport at different temperatures (30-60° C.) and obtained activation energies for H (0.50±0.02 eV) and deuterons (0.55±0.05 eV) transport through graphene [25]. The difference in activation energy for H and D transport agreed with the expected difference in zero-point energies for the O—H and O-D bonds formed with the $SO_3^-$ groups in Nafion [25].

However, Bukola et al. [7] measured record high proton conductivity ~29 S $cm^{-2}$ and H/D separation factors ~14 (14 proton:1 deuteron) using graphene synthesized via scalable chemical vapor deposition (CVD) using Nafion-graphene-Nafion devices under high current density, which is in good agreement with the separation factor ~10 (10 protons:1 deuteron) for mechanically exfoliated graphene reported by Lozada-Hidalgo et al. [8,24], but with proton conductivity values of only ~3 mS $cm^{-2}$. Further, Bukola et al. [7] also reported negligible transport of potassium ions (~0.66 nm hydrated diameter) compared to proton in their devices [7].

These observations have profound implications for H/D and $D_2$-He separations since: a) the high H:D selectivity obtained even for record high H and D transport rates indicates that transport through the 2D lattice (and not through defects) dominates, b) the record high proton conductance measured could not be attributed to defects in CVD graphene alone, albeit transport through defects that do not permit $K^+$ transport cannot be completely ruled out [26], c) the device configuration/interfacing of the 2D material strongly influences the measured H conductivity leading to variations of up to 4 orders of magnitude, and d) practical applications typically use polycrystalline large-area monolayer graphene or h-BN synthesized via CVD, which inevitably contain grain boundaries, wrinkles, and other atomic/vacancy defects. Further, it remains unclear if the H and D transport behavior for CVD h-BN (wide band gap insulator) will be similar or completely different than the observations by Bukola et al. [7] for CVD graphene (electrical conductor) and Lozada-Hidalgo et al. [8,24] for mechanically exfoliated graphene. No prior studies of H and D transport through CVD h-BN exist to this date, despite h-BN showing orders of magnitude higher H and D transport than graphene and thereby being significantly more attractive for enabling practical applications.

Proposed Research and Methods: An objective of this disclosure is to advance fundamental understanding on H/D transport rates and $D_2$-He separations through atomically thin CVD h-BN membranes to inform practical applications of this technology. It is an aim to test: i) if increasing the defect density in CVD grown monolayer h-BN causes the H and D transport rates to increase along with a decrease in H/D selectivity, then the dominant mode of transport is through defects; ii) if increasing the defect density in CVD grown monolayer h-BN causes the H and D transport rates to increase without a decrease in H/D selectivity, then the dominant mode of transport is probably through the h-BN lattice and not through the defects; and iii) if increasing the defect density in CVD grown monolayer h-BN causes the D transport rate to increase without a decrease in D/He selectivity, then nanoporous atomically thin h-BN membranes can be beneficial for $D_2$-He separations.

Specifically, hypothesis-driven experimental approaches are systematically explored to fabricate and test large-area atomically thin membranes using h-BN synthesized via CVD for H and D as well as and $D_2$-He separations (Thrust 1), probe the influence of the h-BN structure i.e. elucidate the role of grain boundaries, intrinsic defects and deliberately introduced defects on H and D as well as $D_2$-He separations (Thrust 2), and develop approaches to efficiently maximize selectivity via defect sealing and develop stacking configurations for H and D separations using h-BN membranes (Thrust 3).

Thrust 1 —Probing H, D and He Transport Through CVD Grown Monolayer h-BN

Subtask 1—High-quality monolayer h-BN synthesis via CVD: Chemical vapor deposition (CVD) on polycrystalline metal foils has emerged as one the most cost effective and scalable methods for high quality continuous monolayer 2D material synthesis [27,28]. The large parameter space of variables accessible via CVD provides avenues to tune the elemental composition, quality, layer numbers, and crystal/domain size of 2D materials. Herein, prior advances in 2D material synthesis [29-54], including detailed complementary in-situ observations during CVD of h-BN [30], are leveraged to synthesize high-quality i) single crystalline monolayer h-BN domains and ii) continuous monolayer films of h-BN to fabricate devices and characterize H, D and He transport (see Subtask 2). An advantage of single crystalline domains is that they are free from grain boundaries and associated defects typically found in continuous polycrystalline films and hence serve as effective controls [49]. As further controls, single crystalline h-BN domains with <0.5 nm $Al_2O_3$ deposited via atomic layer deposition (ALD) to selectively nucleate on intrinsic defects and effectively seal them [55,56] are also used. Finally, mechanically exfoliated flakes of monolayer h-BN [57] are used as further controls to rule out effects on transport from any intrinsic lattice defects that are not sealed via ALD in the high-quality single crystalline h-BN domains [49].

Specifically, high-quality monolayer h-BN growth via CVD can be performed on commercially available Pt foil (~25 μm thick, ~99.99% purity, Alfa Aesar) [58]. The rationale for the choice of Pt foils is the relatively weak interaction between h-BN and Pt that allows for the h-BN to be easily peeled-away from the surface allowing re-use of the Pt foil for h-BN growth [58]. Such re-use of the Pt foil ensures minimal variability in the quality of the synthesized h-BN films [58]. Initially, the foil is cleaned in acetone, followed by isopropanol to remove any contaminants from foil manufacturing. The cleaned foils are rinsed multiple times in DI water and dried. The dried foil is loaded into a custom-built hot-walled CVD reactor, heated to ~1050° C. under $H_2$ atmosphere at low pressure conditions (~1 Torr), and annealed for 60 min to allow for grain growth within the foil. Post annealing, the boron and nitrogen precursors are introduced by subliming ammonia borane or by using borazine with $H_2$ as the carrier gas [30,58]. High precision mass flow controllers can be used to maintain precise control over the precursor dosage, $H_2$ flow rate using, and CVD process time can be leveraged to synthesize high-quality single crystalline monolayer h-BN domains, as well as high-quality continuous but polycrystalline monolayer h-BN films. The synthesized monolayer h-BN on Pt can be characterized using scanning electron microscopy (SEM) for film coverage and uniformity. Optical microscopy and Raman spectroscopy can be performed to evaluate film uniformity and quality, respectively, after transfer to $SiO_2$ 300 nm/Si wafers. As a back-up, if needed, Cu foil (18-25 µm thick, ~99.9% purity) or Fe foil (100-125 µm thick, ~99.9% purity) can also be used for CVD of h-BN. Preliminary results demonstrate synthesis of single crystalline monolayer domains and continuous h-BN films [41,48,50,51].

Subtask 2—Device fabrication and measuring H, D and He transport: Two different kind of devices are fabricated and H, D, and He transport is thoroughly characterized for each variant of h-BN synthesized herein (see Subtask 1 and 3).

Nafion-h-BN-Nafion Electrochemical Pump Cells with Mass Spectrometry

Nafion-h-BN-Nafion electrochemical pumps devices are fabricated by hot-pressing ~1.5 cm×1.5 cm Nafion layer (Nafion 211, 25 µm thick) onto ~1 cm×1 cm of continuous high-quality h-BN films on Pt foil at 140° C. [2,7]. Subsequent removal of the Pt foil by peeling [58] of the h-BN using the Nafion layer as support scaffold allows for clean transfer of large-area h-BN from Pt foil to Nafion. If required, the bubbling transfer method [59] where the Nafion-h-BN-Pt foil is dipped into 0.1 M NaOH solution and used as a cathode (anode is another bare Pt foil) to evolve $H_2$ bubbles at the h-BN-Pt interface to gently de-laminate the h-BN from Pt foil [59] can also be used. Next, an additional layer of Nafion 211 is hot-pressed on the h-BN-Nafion to form a Nafion-h-BN-Nafion sandwich [2,7]. Finally, carbon-cloth electrodes coated with 4 mg/cm² of Pt black are added on both sides of the Nafion-h-BN-Nafion to form electrochemical pump cells [7]. The electrochemical pump cells are electrically contacted and sandwiched between two metal chambers in a custom-built test rig [2,7]. I-V curves are acquired using a potentiostat (Gamry 1010E) in linear sweep or cyclic voltammetry setting. High precision mass flow controllers are used to accurately control the gas composition ($H_2$, $D_2$, and He humidified with water vapor [7]) of the inlet metal chamber and the gas evolved at the outlet metal chamber under vacuum is monitored via mass spectrometer for detailed quantitative analysis [2,7].

Figure 14:
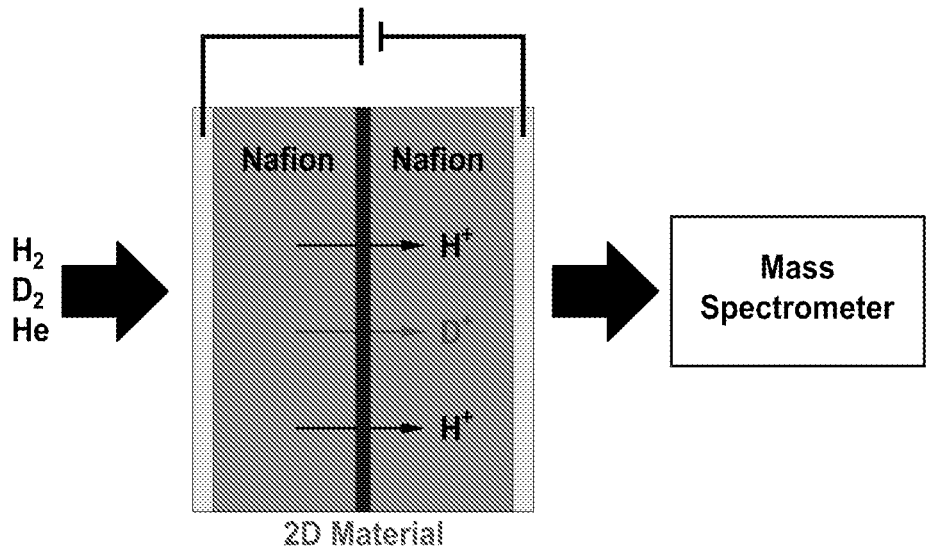
FIG. 14. Schematic of Nafion-2D material-Nafion electrochemical pump cells. Preliminary data albeit with Nafion-graphene-Nafion devices shows feasibility of the proposed experiments.
Figure 15:
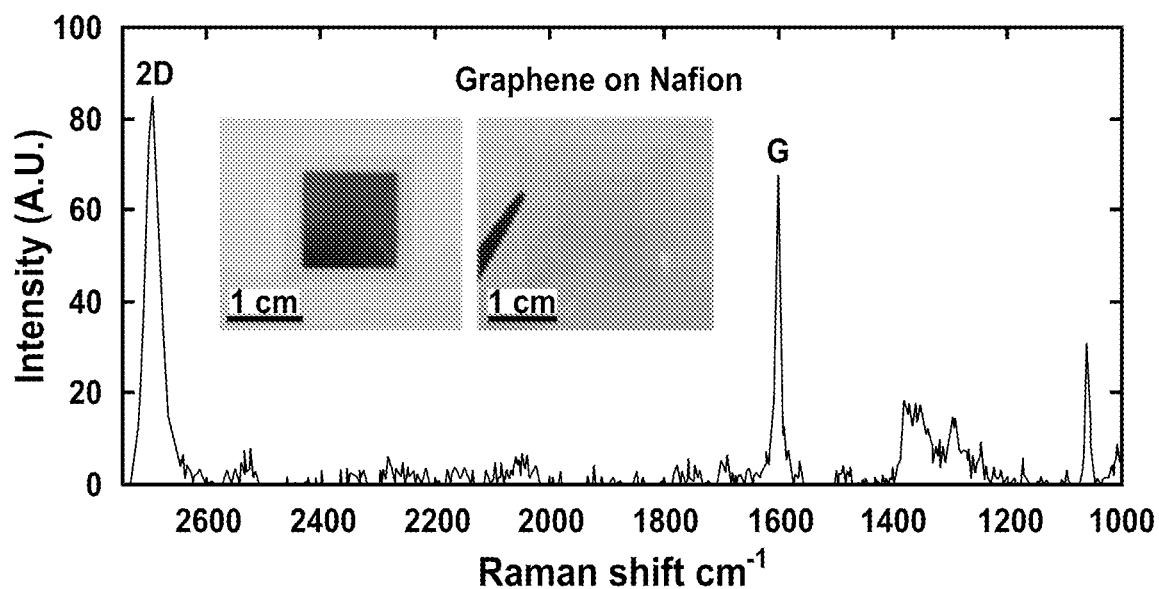
FIG. 15. Insets show Nafion film hot-pressed on CVD graphene on Cu foil and subsequent graphene transfer to Nafion. Raman spectra confirming graphene transfer on Nafion.
Figure 16:
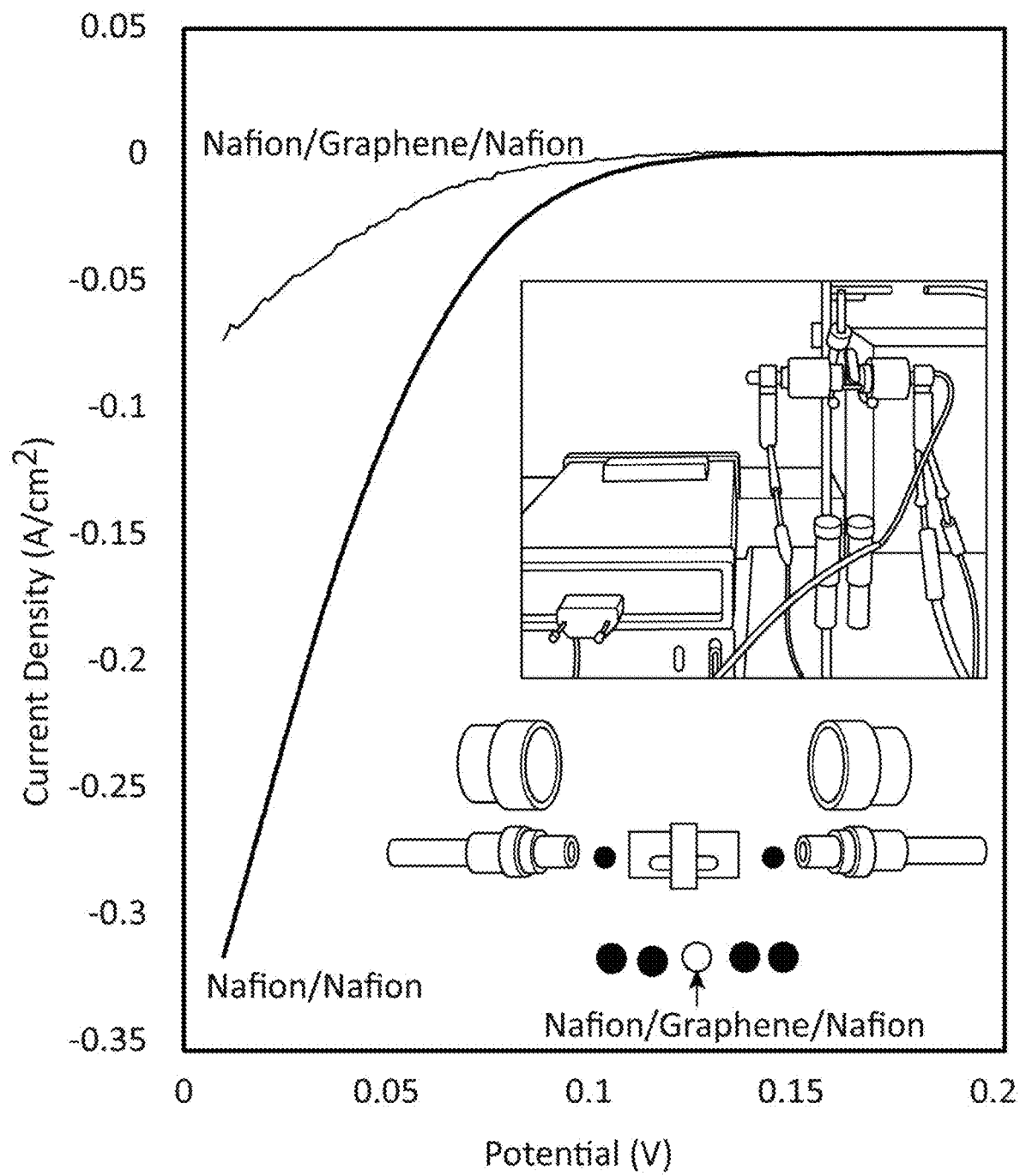
FIG. 16. Current density vs Voltage for protons in Nafion-graphene-Nafion devices. Insets show a custom-built test set-up with power source, electrodes and device components.

Initially, I-V characteristic are measured for pure $H_2$, $D_2$ and He humidified with water vapor [7] before systematically varying the mixture of gases while monitoring the exit gas flow via the mass spectrometer at all times. Specifically, the application of a bias to the electrochemical pump cell can cause $H_2$ and $D_2$ to dissociate (into H and D respectively) on the Pt in the carbon cloth on the inlet side of the cell and transport through the Nafion before they encounter the embedded monolayer h-BN. Upon reaching the monolayer h-BN the rate of H and D transport through h-BN can cause separation and the selectively transported H and D can transport through the Nafion on the other side before re-combining on the Pt in the carbon cloth at the outlet chamber and quantified via the mass spectrometer. A comparison between the inlet flow composition and the outlet flow composition can be used to compute H/D separation factors for h-BN. The pathways for He transport are the water channels in the Nafion layers and defects in the h-BN lattice. Hence, any He measured in the mass spectrometer is a measure of defects in the monolayer h-BN and can be used to compute $D_2$-He selectivity. Finally, transport of H, D and He for a range of temperatures from 25-80° C. for each can be probed to obtain an activation energy from Arrhenius plots [7,25]. Preliminary results with Nafion-graphene-Nafion devices shows the feasibility of the experiments with electrochemical pump cells (FIG. 14-FIG. 16).

Liquid Phase Transport Across Suspended h-BN Membranes

Figure 17:
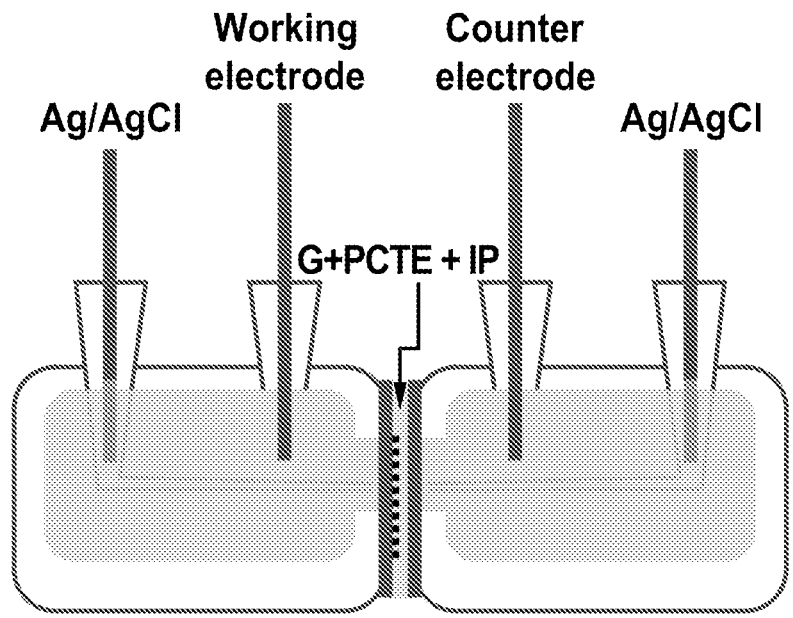
FIG. 17. Schematic of the electrochemical set-up used to measure H and D transport through h-BN membranes in liquid state.
Figure 19:
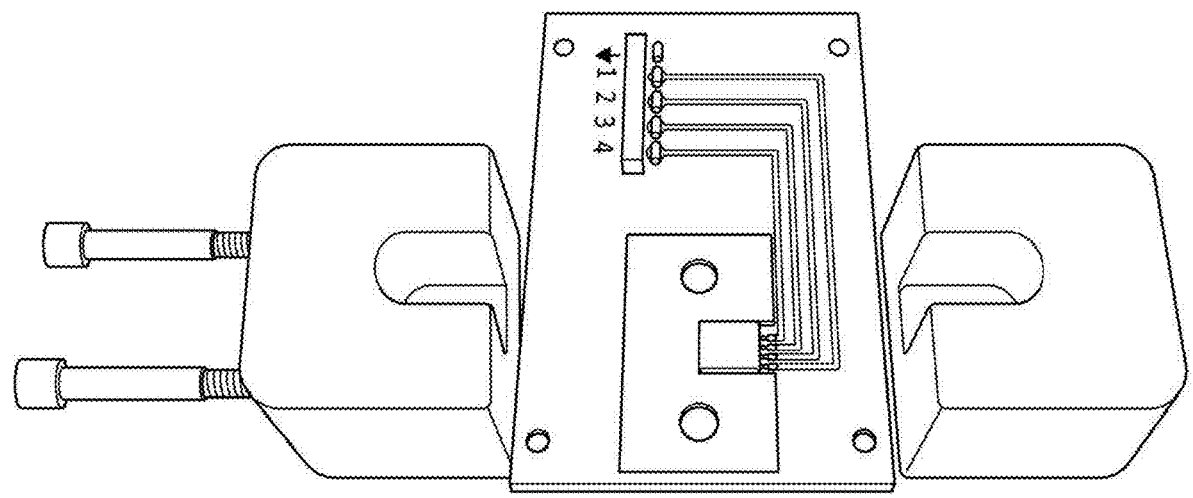
FIG. 19-FIG. 20. Image of a custom built set-up used to measure proton transport and diffusion on graphene or h-BN transferred to a TEM grids, as well as (FIG. 20) the capability to electrically contact graphene or h-BN via Au electrodes on the TEM grids.
Figure 20:
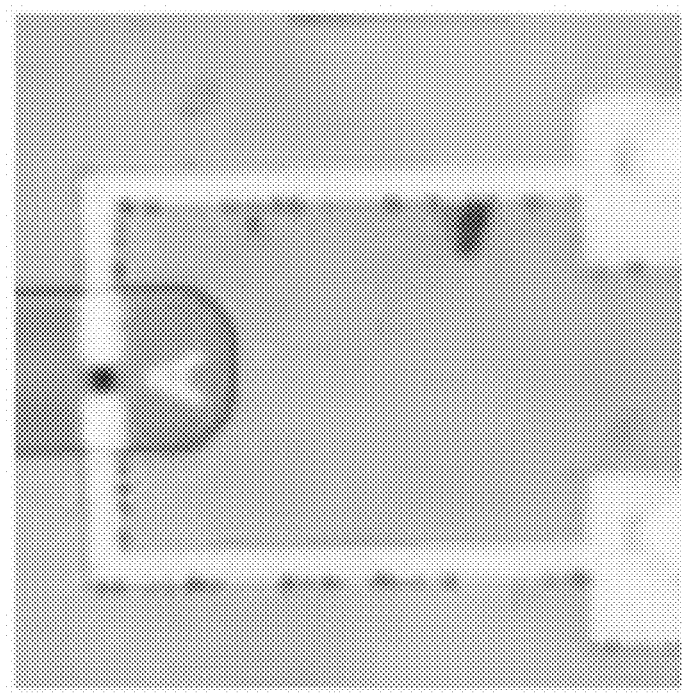

An advantage of liquid phase transport through suspended h-BN membranes is that it allows for direct measurements of H and D transport without any convolution from device fabrication/interfacing. For liquid phase transport measurements, the synthesized high-quality continuous film of monolayer h-BN is suspended over a ~2-5 µm diameter aperture in a Si, $SiO_2$, or $Si_3N_4$ wafer or TEM grids with a single aperture using well-developed polymer-free transfer methods [49-51] to minimize contamination of the h-BN surface. Next, the h-BN membranes on TEM grids are mounted into a custom-built electrochemical cell (FIG. 17, FIG. 19). A potentiostat (Gamry 1010E) connected to the working electrodes and counter electrodes is used to measure I-V characteristics, while Ag/AgCl reference electrodes are used to monitor the potential in close proximity to the suspended h-BN via the Luggin capillaries on either side (FIG. 17). I-V characteristics indicating H transport are measured by filling the reservoirs on either side with 0.1 M HCl in $H_2O$. Similarly, 0.1 M DCl in $D_2O$ is used to measure D transport and the ratio of rate of transport between H and D is used to compute selectivity.

Figure 18:
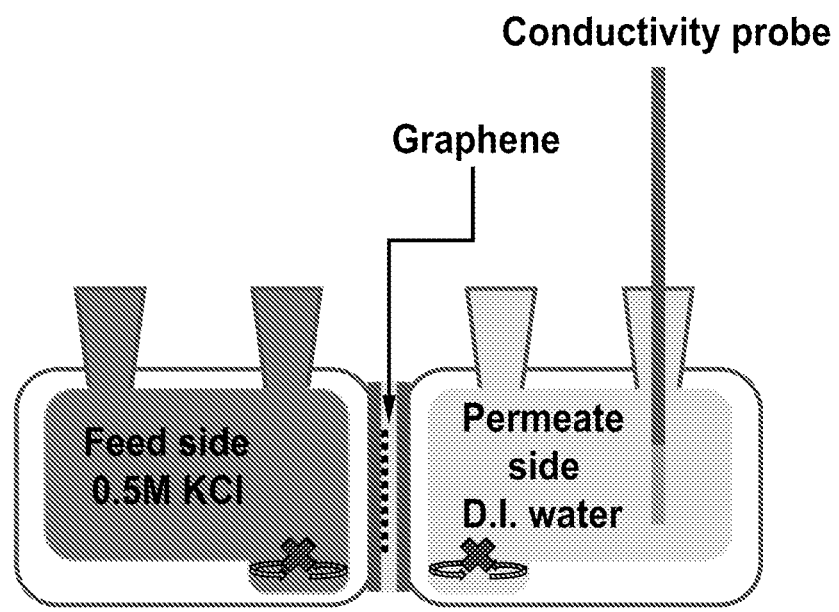
FIG. 18. Schematic of set-up to measure diffusion-driven transport of salts and small molecules through h-BN membranes to quantify leakage through defects.
Figure 21:
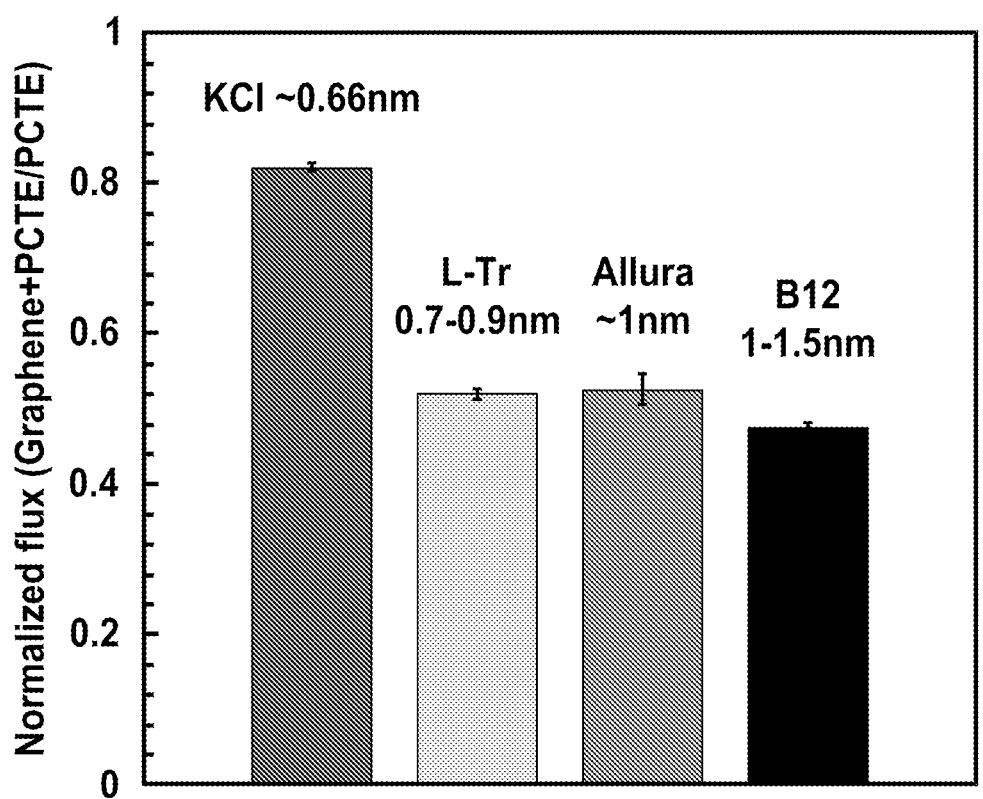
FIG. 21. Diffusion driven transport of salts and small molecules to effectively quantify defects in 2D materials.

Additionally, diffusive transport of KCl ($K^+$ and hydrated diameter ~0.66 nm), L-tryptophan (L-Tr, ~0.7-0.9 nm), Allura Red food dye ~1 nm, Vitamin $B_{12}$ ($B_{12}$,~1-1.5 nm), and egg protein Lysozyme (Lz, 3.8-4 nm), respectively, are used to quantify defects in the suspended h-BN membranes in the same set-up (FIG. 18, FIG. 21). Specifically, 0.5 M KCl is introduced in the feed side and concentration increase in the permeate side filled with deionized water is observe using the in-situ conductivity probe (Mettler Toledo) [41, 48-51] Small molecule diffusion through h-BN is measured using an in-situ UV Vis probe (Agilent Cary 60) used to monitor the increase in concentration of the permeate side filled with 0.5 M KCl when the feed side is filled with 0.1 mM small molecule in 0.5 M KCl.

Defects>5-10 nm can be imaged using low resolution transmission electron microscopy or ultra-high resolution SEM. Taken together, the transport characteristics measured using the two different device configurations in Subtask 2 for each variant of h-BN synthesized herein (see Subtask 1 and 3) along with the relevant controls (Subtask 1) can allow for fundamental insights into H/D transport and $D_2$-He separations through CVD grown monolayer h-BN membranes [2,7].

Thrust 2—Probing the Influence of h-BN Structure and Defects on H, D and He Transport Herein, the influence of the h-BN structure i.e. the role of grain boundaries, intrinsic defects and deliberately introduced defects on H and D as well as $D_2$-He separations are systematically studied and elucidated. Specifically, the thorough transport characterization using devices described in Subtask 2 as well as atomic resolution imaging on representative samples are used as levers for feedback. Atomic resolution imaging can be performed using a Nion Ultra STEM (~60 kV) at the user facility in the Center for Nanophase Materials Sciences (CNMS) at Oak Ridge National Lab (ORNL).

Initially, the liquid phase transport measurements on mechanically exfoliated h-BN can be used as baselines for comparison and <0.5 nm $Al_2O_3$ deposited via ALD can selectively seal any intrinsic defects present [55,56]. Similar measurements (with and without<0.5 nm $Al_2O_3$) can be also be performed on high quality single crystalline monolayer h-BN domains to facilitate a comparison between structural quality of h-BN grown via CVD with mechanically exfoliated h-BN.

Next, the effect of grain boundaries can be elucidated by systematically varying the domain sizes of h-BN in the continuous monolayer. Specifically, to achieve smaller domain sizes, the h-BN precursor delivery to the CVD reactor is increased by increasing the precursor sublimation temperature of ammonia borane or increasing the flow rate of borazine. The increased precursor delivery to CVD furnace results in an increase in precursor impingement on the Pt foil surface thereby increasing nucleation density. The increased density of nuclei can result in smaller domains covering the surface of the Pt foil and their merging can lead to an increase in domain/grain boundaries in the monolayer h-BN film. Similarly, larger h-BN domains sizes can be synthesized by decreasing the h-BN precursor delivery to the CVD reactor, albeit keeping it above the threshold for nucleation. Preliminary results demonstrate the feasibility of controlling h-BN domain size in monolayer h-BN films.

Subtask 3—Deliberate introduction of defects in the h-BN lattice: Finally, the influence of deliberately introduced defects in h-BN lattice on H and D as well as $D_2$-He separations is explored. Specifically, He ion bombardment in the focused ion beam can be used to introduce defects in the synthesized high-quality monolayer h-BN films after transfer to TEM grids or Nafion [60]. The rationale for the choice of He ion bombardment is robustly supported by atomistic simulations investigating the response of monolayer h-BN to irradiation with noble gas ions having energies from 35 eV up to 10 MeV [60]. These simulations indicate the possibility of using acceleration voltages commonly accessible in focused ion beam instruments for creating controlled defects (single vacancy, double vacancy, and complex vacancy) in single-layer and bulk h-BN [60]. If the He ion bombardment fails, as a back-up option Ar plasma in a Harrick plasma etcher can be used to introduce defects in monolayer h-BN [61,62]. Transport can be evaluated using devices in Subtask 2.

Thrust 3—Maximizing Selectivity Via Defect Sealing and Stacking Configurations

Here, it is an aim to leverage a) the propensity of Pt deposition via ALD to preferentially decorate 2D material grain boundaries [63], b) the strong enhancement in H and D transport rates upon coating 2D materials with Pt to effectively seal defects in monolayer h-BN and simultaneously increase H and D transport. Further, a stacking concept with multiple h-BN membranes decorated with Pt nanoparticles separated by Nafion is proposed to amplify selectivity between H and D as well as $D_2$-He while still maintaining very high H and D flux.

Figure 22:
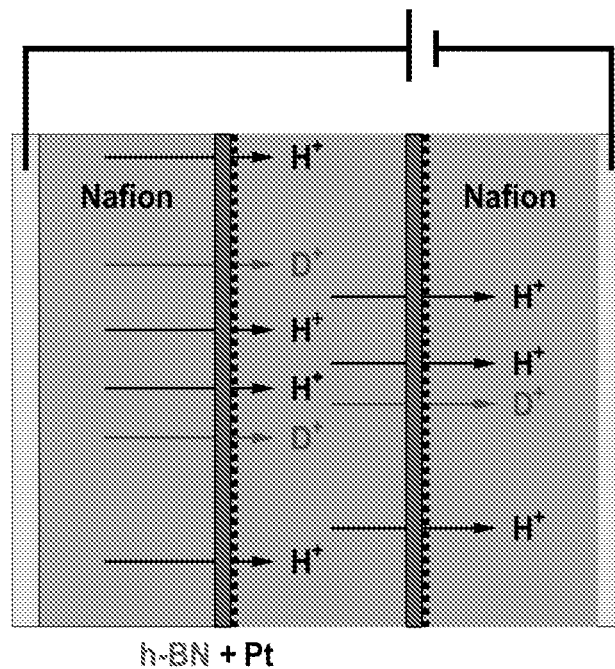
FIG. 22. Stacking concept with multiple graphene or h-BN membranes decorated with Pt nanoparticles separated by Nafion.

Specifically, ALD deposition of Pt (<0.5 nm) on h-BN transferred to Nafion (see Subtask 1) can be performed and H, D and He transport using the devices described in Subtask 2 can be thoroughly characterized. The ALD of Pt can preferentially nucleate nanoparticles on grain boundaries and intrinsic defects in h-BN, effectively sealing them and increasing H/D selectivity by preventing non-selective transport through defects. Additionally, several such Pt nanoparticle decorated h-BN membranes on Nafion can be stacked in cell configuration (FIG. 22, also see Subtask 2) wherein each pass through the h-BN layers allows for transport rate based separations of H and D. Such an approach with h-BN could potentially enable orders of magnitude (~10-100) H/D higher selectivity whilst maintaining at least 5× higher flux compared to devices with monolayer graphene and holds potential to revolutionize H and D as well as $D_2$-He separations. Similarly, these materials and systems can be used for tritium-$^3$He separation, or separations including species such as TD, HD, HT, etc.

The above description relates to the use of h-BN, but graphene and/or other 2D materials can also be used.

REFERENCES (1) Bunch, J. S.; Verbridge, S. S.; Alden, J. S.; van der Zande, A. M.; Parpia, J. M.; Craighead, H. G.; McEuen, P. L. Impermeable Atomic Membranes from Graphene Sheets. *Nano Lett.* 2008, 8, 2458-2462.

(2) Hu, S.; Lozada-Hidalgo, M.; Wang, F. C.; Mishchenko, A.; Schedin, F.; Nair, R. R.; Hill, E. W.; Boukhvalov, D. W.; Katsnelson, M. I.; Dryfe, R. A. W.; Grigorieva, I. V.; Wu, H. A.; Geim, A. K. Proton Transport through One-Atom-Thick Crystals. *Nature* 2014, 516, 227-230.

(3) Karnik, R. N. Materials Science: Breakthrough for Protons. *Nature* 2014, 516, 173-175.

(4) Li, L. H.; Cervenka, J.; Watanabe, K.; Taniguchi, T.; Chen, Y. Strong Oxidation Resistance of Atomically Thin Boron Nitride Nanosheets. *ACS Nano* 2014, 8, 1457-1462.

(5) Falin, A.; Cai, Q.; Santos, E. J. G.; Scullion, D.; Qian, D.; Zhang, R.; Yang, Z.; Huang, S.; Watanabe, K.; Taniguchi, T.; Barnett, M. R.; Chen, Y.; Ruoff, R. S.; Li, L. H. Mechanical Properties of Atomically Thin Boron Nitride and the Role of Interlayer Interactions. *Nat. Commun.* 2017, 8, 15815.

(6) Lin, Y.; Connell, J. W. Advances in 2D Boron Nitride Nanostructures: Nanosheets, Nanoribbons, Nanomeshes, and Hybrids with Graphene. *Nanoscale* 2012, 4, 6908-6939.

(7) Bukola, S.; Liang, Y.; Korzeniewski, C.; Harris, J.; Creager, S. Selective Proton/Deuteron Transport through NafionlGraphenelNafion Sandwich Structures at High Current Density. *J. Am. Chem. Soc.* 2018, 140, 1743-1752.

(8) Lozada-Hidalgo, M.; Hu, S.; Marshall, O.; Mishchenko, A.; Grigorenko, A. N.; Dryfe, R. A. W.; Radha, B.; Grigorieva, I. V.; Geim, A. K. Sieving Hydrogen Isotopes through Two-Dimensional Crystals. *Science* (80-.). 2016, 351, 68-70.

(9) Holmes, S. M.; Balakrishnan, P.; Kalangi, V. S.; Zhang, X.; Lozada-Hidalgo, M.; Ajayan, P. M.; Nair, R. R. 2D Crystals Significantly Enhance the Performance of a Working Fuel Cell. *Adv. Energy Mater.* 2017, 7,1-7.

(10) Lozada-Hidalgo, M.; Zhang, S.; Hu, S.; Kravets, V. G.; Rodriguez, F. J.; Berdyugin, A.; Grigorenko, A.; Geim, A. K. Giant Photoeffect in Proton Transport through Graphene Membranes. *Nat. Nanotechnol.* 2018, 13, 300-303.

(11) Tosti, S.; Pozio, A. Membrane Processes for the Nuclear Fusion Fuel Cycle. *Membranes (Basel).* 2018, 8.

(12) Zhu, X.; Lei, S.; Tsai, S.-H.; Zhang, X.; Liu, J.; Yin, G.; Tang, M.; Tones, C. M.; Navabi, A.; Jin, Z.; Tsai, S.-P.; Qasem, H.; Wang, Y.; Vajtai, R.; Lake, R. K.; Ajayan, P. M.; Wang, K. L. A Study of Vertical Transport through Graphene toward Control of Quantum Tunneling. *Nano Lett.* 2018, 18, 682-688.

(13) Britnell, L.; Gorbachev, R. V.; Jalil, R.; Belle, B. D.; Schedin, F.; Katsnelson, M. I.; Eaves, L.; Morozov, S. V.; Mayorov, A. S.; Peres, N. M. R.; Castro Neto, A. H.; Leist, J.; Geim, A. K.; Ponomarenko, L. A.; Novoselov, K. S. Electron Tunneling through Ultrathin Boron Nitride Crystalline Barriers. *Nano Lett.* 2012, 12, 1707-1710.

(14) Miao, M.; Nardelli, M. B.; Wang, Q.; Liu, Y. First Principles Study of the Permeability of Graphene to Hydrogen Atoms. *Phys. Chem. Chem. Phys.* 2013, 15, 16132.

(15) Tsetseris, L.; Pantelides, S. T. Graphene: An Impermeable or Selectively Permeable Membrane for Atomic Species? *Carbon N. Y.* 2014, 67, 58-63.

(16) Poltaysky, I.; Zheng, L.; Mortazavi, M.; Tkatchenko, A. Quantum Tunneling of Thermal Protons through Pristine Graphene. *J. Chem. Phys.* 2018, 148, 204707.

(17) Feng, Y.; Chen, J.; Fang, W.; Wang, E. G.; Michaelides, A.; Li, X. Z. Hydrogenation Facilitates Proton Transfer through Two-Dimensional Honeycomb Crystals. *J. Phys. Chem. Lett.* 2017, 8, 6009-6014.

(18) Achtyl, J. L.; Unocic, R. R.; Xu, L.; Cai, Y.; Raju, M.; Zhang, W.; Sacci, R. L.; Vlassiouk, I. V.; Fulvio, P. F.; Ganesh, P.; Wesolowski, D. J.; Dai, S.; van Duin, A. C. T.; Neurock, M.; Geiger, F. M. Aqueous Proton Transfer across Single-Layer Graphene. *Nat. Commun.* 2015, 6, 6539.

(19) Kroes, J. M. H.; Fasolino, A.; Katsnelson, M. I. Density Functional Based Simulations of Proton Permeation of Graphene and Hexagonal Boron Nitride. *Phys. Chem. Chem. Phys.* 2017, 19, 5813-5817.

(20) Zhou, W.; Zhang, Y.-Y.; Chen, J.; Li, D.; Zhou, J.; Liu, Z.; Chisholm, M. F.; Pantelides, S. T.; Loh, K. P. Dislocation-Driven Growth of Two-Dimensional Lateral Quantum-Well Superlattices. *Sci. Adv.* 2018, 4, eaap9096.

(21) Bartolomei, M.; Hernáandez, M. I.; Campos-Martínez, J.; Hernández-Lamoneda, R. Graphene Multi-Protonation: A Cooperative Mechanism for Proton Permeation. *Carbon N. Y.* 2019, 144, 724-730.

(22) Zhang, Q.; Ju, M.; Chen, L.; Zeng, X. C. Differential Permeability of Proton Isotopes through Graphene and Graphene Analogue Monolayer. *J. Phys. Chem. Lett.* 2016, 7, 3395-3400.

(23) Walker, M. I.; Braeuninger-Weimer, P.; Weatherup, R. S.; Hofmann, S.; Keyser, U. F. Measuring the Proton Selectivity of Graphene Membranes. *AppL Phys. Lett.* 2015, 107, 213104.

(24) Lozada-Hidalgo, M.; Zhang, S.; Hu, S.; Esfandiar, A.; Grigorieva, I. V; Geim, A. K. Scalable and Efficient Separation of Hydrogen Isotopes Using Graphene-Based Electrochemical Pumping. *Nat. Commun.* 2017, 8, 15215.

(25) Bukola, S.; Creager, S. E. A Charge-Transfer Resistance Model and Arrhenius Activation Analysis for Hydrogen Ion Transmission across Single-Layer Graphene. *Electrochim. Acta* 2019, 296, 1-7.

(26) Huang, P. Y.; Ruiz-Vargas, C. S.; van der Zande, A. M.; Whitney, W. S.; Levendorf, M. P.; Kevek, J. W.; Garg, S.; Alden, J. S.; Hustedt, C. J.; Zhu, Y.; Park, J.; McEuen, P. L.; Muller, D. a. Grains and Grain Boundaries in Single-Layer Graphene Atomic Patchwork Quilts. *Nature* 2011, 469, 389-392.

(27) Kim, K K.; Hsu, A.; Jia, X.; Kim, S. M.; Shi, Y.; Hofmann, M.; Nezich, D.; Rodriguez-Nieva, J. F.; Dresselhaus, M.; Palacios, T.; Kong, J. Synthesis of Monolayer Hexagonal Boron Nitride on Cu Foil Using Chemical Vapor Deposition. *Nano Lett.* 2012, 12, 161-166.

(28) Batzill, M. The Surface Science of Graphene: Metal Interfaces, CVD Synthesis, Nanoribbons, Chemical Modifications, and Defects. *Surf. Sci. Rep.* 2012, 67, 83-115.

(29) Kidambi, P. R.; Bayer, B. C.; Blume, R.; Wang, Z.-J.; Baehtz, C.; Weatherup, R. S.; Willinger, M.-G.; Schloegl, R.; Hofmann, S. Observing Graphene Grow: Catalyst-Graphene Interactions during Scalable Graphene Growth on Polycrystalline Copper. *Nano Lett.* 2013, 13, 4769-4778.

(30) Kidambi, P. R.; Blume, R.; Kling, J.; Wagner, J. B.; Baehtz, C.; Weatherup, R. S.; Schloegl, R.; Bayer, B. C.; Hofmann, S. In Situ Observations during Chemical Vapor Deposition of Hexagonal Boron Nitride on Polycrystalline Copper. *Chem. Mater.* 2014, 26, 6380-6392.

(31) Sanders, S.; Cabrero-Vilatela, A.; Kidambi, P. R.; Alexander-Webber, J. A.; Weijtens, C.; Braeuninger-Weimer, P.; Aria, A. I.; Qasim, M. M.; Wilkinson, T. D.; Robertson, J.; Hofmann, S.; Meyer, J. Engineering High Charge Transfer N-Doping of Graphene Electrodes and Its Application to Organic Electronics. *Nanoscale* 2015, 7, 13135-13142.

(32) Boutilier, M. S. H. M. S. H.; Jang, D.; Idrobo, J.-C. J. C.; Kidambi, P. R.; Hadjiconstantinou, N. G. N. G.; Karnik, R. Molecular Sieving Across Centimeter-Scale Single-Layer Nanoporous Graphene Membranes. *ACS Nano* 2017, 11, 5726-5736.

(33) Kidambi, P. R.; Ducati, C.; Dlubak, B.; Gardiner, D.; Weatherup, R. S.; Martin, M.-B.; Seneor, P.; Coles, H.; Hofmann, S. The Parameter Space of Graphene Chemical Vapor Deposition on Polycrystalline Cu. *J. Phys. Chem. C* 2012, 116, 22492-22501.

(34) Butt, H.; Kidambi, P. R.; Dlubak, B.; Montelongo, Y.; Palani, A.; Amaratunga, G. A. J. J.; Hofmann, S.; Wilkinson, T. D. Visible Diffraction from Graphene and Its Application in Holograms. *Adv. Opt. Mater.* 2013, 1, 869-874.

(35) Weatherup, R. S.; Amara, H.; Blume, R.; Dlubak, B.; Bayer, B. C.; Diana, M.; Bahri, M.; Cabrero-Vilatela, A.; Caneva, S.; Kidambi, P. R.; Martin, M.-B.; Deranlot, C.; Seneor, P.; Schloegl, R.; Ducastelle, F.; Bichara, C.; Hofmann, S. Interdependency of Subsurface Carbon Distribution and Graphene-Catalyst Interaction. *J. Am. Chem. Soc.* 2014, 136, 13698-13708.

(36) Blume, R.; Kidambi, P. R.; Bayer, B. C.; Weatherup, R. S.; Wang, Z.-J.; Weinberg, G.; Willinger, M.-G.; Greiner, M.; Hofmann, S.; Knop-Gericke, A.; Schlögl, R. The Influence of Intercalated Oxygen on the Properties of Graphene on Polycrystalline Cu under Various Environmental Conditions. *Phys. Chem. Chem. Phys.* 2014, 16, 25989-26003.

(37) Wang, R.; Whelan, P. R.; Braeuninger-Weimer, P.; Tappertzhofen, S.; Alexander-Webber, J. A.; Van Veldhoven, Z. A.; Kidambi, P. R.; Jessen, B. S.; Booth, T.; Bøggild, P.; Hofmann, S. Catalyst Interface Engineering for Improved 2D Film Lift-Off and Transfer. *ACS Appl. Mater. Interfaces* 2016, 8, 33072-33082.

(38) Kidambi, P. R.; Weijtens, C.; Robertson, J.; Hofmann, S.; Meyer, J. Multifunctional Oxides for Integrated Manufacturing of Efficient Graphene Electrodes for Organic Electronics. *Appl. Phys. Lett.* 2015, 106, 063304.

(39) Wang, L.; Williams, C. M.; Boutilier, M. S. H.; Kidambi, P. R.; Karnik, R. Single-Layer Graphene Membranes Withstand Ultrahigh Applied Pressure. *Nano Lett.* 2017, 17, 3081-3088.

(40) Kratzer, M.; Bayer, B. C.; Kidambi, P. R.; Matković, A.; Gajić, R.; Cabrero-Vilatela, A.; Weatherup, R. S.; Hofmann, S.; Teichert, C. Effects of Polymethylmethacrylate-Transfer Residues on the Growth of Organic Semiconductor Molecules on Chemical Vapor Deposited Graphene. *Appl. Phys. Lett.* 2015, 106, 103101.

(41) Kidambi, P. R.; Mariappan, D. D.; Dee, N. T.; Vyatskikh, A.; Zhang, S.; Karnik, R.; Hart, A. J. A Scalable Route to Nanoporous Large-Area Atomically Thin Graphene Membranes by Roll-to-Roll Chemical Vapor Deposition and Polymer Support Casting. *ACS Appl. Mater. Interfaces* 2018, 10, 10369-10378.

(42) Meyer, J.; Kidambi, P. R.; Bayer, B. C.; Weijtens, C.; Kuhn, A.; Centeno, A.; Pesquera, A.; Zurutuza, A.; Robertson, J.; Hofmann, S. Metal Oxide Induced Charge Transfer Doping and Band Alignment of Graphene Electrodes for Efficient Organic Light Emitting Diodes. *Sci. Rep.* 2015, 4, 5380.

(43) Xi, K.; Kidambi, P. R.; Chen, R.; Gao, C.; Peng, X.; Ducati, C.; Hofmann, S.; Kumar, R. V. V. Binder Free Three-Dimensional Sulphur/Few-Layer Graphene Foam Cathode with Enhanced High-Rate Capability for Rechargeable Lithium Sulphur Batteries. *Nanoscale* 2014, 6, 5746-5753.

(44) Kuruvila, A.; Kidambi, P. R.; Kling, J.; Wagner, J. B.; Robertson, J.; Hofmann, S.; Meyer, J. Organic Light Emitting Diodes with Environmentally and Thermally Stable Doped Graphene Electrodes. *J. Mater. Chem. C* 2014, 2, 6940.

(45) Kidambi, P. R.; Bayer, B. C.; Weatherup, R. S.; Ochs, R.; Ducati, C.; Szabó, D. V. V.; Hofmann, S. Hafnia Nanoparticles—a Model System for Graphene Growth on a Dielectric. *Phys. status solidi-Rapid Res. Lett.* 2011, 5, 341-343.

(46) Piquemal-Banci, M.; Galceran, R.; Caneva, S.; Martin, M. B.; Weatherup, R. S.; Kidambi, P. R.; Bouzehouane, K.; Xavier, S.; Anane, A.; Petroff, F.; Fert, A.; Robertson, J.; Hofmann, S.; Dlubak, B.; Seneor, P. Magnetic Tunnel Junctions with Monolayer Hexagonal Boron Nitride Tunnel Barriers. *AppL Phys. Lett.* 2016, 108.

(47) Piquemal-Banci, M.; Galceran, R.; Godel, F.; Caneva, S.; Martin, M.-B.; Weatherup, R. S.; Kidambi, P. R.; Bouzehouane, K.; Xavier, S.; Anane, A.; Petroff, F.; Fert, A.; Dubois, S. M.-M.; Charlier, J.-C.; Robertson, J.; Hofmann, S.; Dlubak, B.; Seneor, P. Insulator-to-Metallic Spin-Filtering in 2D-Magnetic Tunnel Junctions Based on Hexagonal Boron Nitride. *ACS Nano* 2018, 12, 4712-4718.

(48) Kidambi, P. R.; Nguyen, G. D.; Zhang, S.; Chen, Q.; Kong, J.; Warner, J.; Li, A.-P.; Karnik, R. Facile Fabrication of Large-Area Atomically Thin Membranes by Direct Synthesis of Graphene with Nanoscale Porosity. *Adv. Mater.* 2018, 1804977, 1804977.

(49) Kidambi, P. R.; Boutilier, M. S. H.; Wang, L.; Jang, D.; Kim, J.; Karnik, R. Selective Nanoscale Mass Transport across Atomically Thin Single Crystalline Graphene Membranes. *Adv. Mater.* 2017, 29, 1605896.

(50) Kidambi, P. R.; Jang, D.; Idrobo, J.-C. J.-C.; Boutilier, M. S. H. M. S. H.; Wang, L.; Kong, J.; Karnik, R. Nanoporous Atomically Thin Graphene Membranes for Desalting and Dialysis Applications. *Adv. Mater.* 2017, 29, 1700277.

(51) Kidambi, P. R.; Terry, R. A.; Wang, L.; Boutilier, M. S. H.; Jang, D.; Kong, J.; Karnik, R. Assessment and Control of the Impermeability of Graphene for Atomically Thin Membranes and Barriers. *Nanoscale* 2017, 9, 8496-8507.

(52) Kong, X.-T.; Khan, A. A.; Kidambi, P. R.; Deng, S.; Yetisen, A. K.; Dlubak, B.; Hiralal, P.; Montelongo, Y.; Bowen, J.; Xavier, S.; Jiang, K.; Amaratunga, G. A. J.; Hofmann, S.; Wilkinson, T. D.; Dai, Q.; Butt, H. Graphene-Based Ultrathin Flat Lenses. ACS *Photonics* 2015, 2, 200-207.

(53) Perconte, D.; Cuellar, F. A.; Moreau-Luchaire, C.; Piquemal-Banci, M.; Galceran, R.; Kidambi, P. R.; Martin, M.-B.; Hofmann, S.; Bernard, R.; Dlubak, B.; Seneor, P.; Villegas, J. E. Tunable Klein-like Tunnelling of High-Temperature Superconducting Pairs into Graphene. *Nat. Phys.* 2017, 14, 25-29.

(54) Weatherup, R. S.; Baehtz, C.; Dlubak, B.; Bayer, B. C.; Kidambi, P. R.; Blume, R.; Schloegl, R.; Hofmann, S. Introducing Carbon Diffusion Barriers for Uniform, High-Quality Graphene Growth from Solid Sources. *Nano Lett.* 2013, 13, 4624-4631.

(55) Dlubak, B.; Kidambi, P. R. R.; Weatherup, R. S. S.; Hofmann, S.; Robertson, J. Substrate-Assisted Nucleation of Ultra-Thin Dielectric Layers on Graphene by Atomic Layer Deposition. *Appl. Phys. Lett.* 2012, 100, 173113.

(56) O'Hern, S. C.; Jang, D.; Bose, S.; Idrobo, J. C.; Song, Y.; Laoui, T.; Kong, J.; Karnik, R. Nanofiltration across Defect-Sealed Nanoporous Monolayer Graphene. *Nano Lett.* 2015, 15, 3254-3260.

(57) Novoselov, K. S.; Geim, A. K.; Morozov, S. V; Jiang, D.; Zhang, Y.; Dubonos, S. V; Grigorieva, I. V; Firsov, A. A. Electric Field Effect in Atomically Thin Carbon Films *Science* (80-.). 2004, 306, 666-669.

(58) Wang, R.; Purdie, D. G.; Fan, Y.; Massabuau, F. C. P.; Braeuninger-Weimer, P.; Burton, O. J.; Blume, R.; Schloegl, R.; Lombardo, A.; Weatherup, R. S.; Hofmann, S. A Peeling Approach for Integrated Manufacturing of Large Monolayer H-BN Crystals. *ACS Nano* 2019, 13, acsnano.8b08712.

(59) Ma, D.; Zhang, Y.; Liu, M.; Ji, Q.; Gao, T.; Zhang, Y.; Liu, Z. Clean Transfer of Graphene on Pt Foils Mediated by a Carbon Monoxide Intercalation Process. *Nano Res.* 2013, 6, 671-678.

(60) Lehtinen, O.; Dumur, E.; Kotakoski, J.; Krasheninnikov, A. V.; Nordlund, K.; Keinonen, J. Production of Defects in Hexagonal Boron Nitride Monolayer under Ion Irradiation. *Nucl. Instruments Methods Phys. Res. Sect. B Beam Interact. with Mater. Atoms* 2011, 269, 1327-1331.

(61) Park, H.; Shin, G. H.; Lee, K. J.; Choi, S.-Y. Atomic-Scale Etching of Hexagonal Boron Nitride for Device Integration Based on Two-Dimensional Materials. *Nanoscale* 2018, 10, 15205-15212.

(62) Xu, Z.-Q.; Elbadawi, C.; Tran, T. T.; Kianinia, M.; Li, X.; Liu, D.; Hoffman, T. B.; Nguyen, M.; Kim, S.; Edgar, J. H.; Wu, X.; Song, L.; Ali, S.; Ford, M.; Toth, M.; Aharonovich, I. Single Photon Emission from Plasma Treated 2D Hexagonal Boron Nitride. *Nanoscale* 2018, 10, 7957-7965.

(63) Kim, K; Lee, H. B. R.; Johnson, R. W.; Tanskanen, J. T.; Liu, N.; Kim, M. G.; Pang, C.; Ahn, C.; Bent, S. F.; Bao, Z. Selective Metal Deposition at Graphene Line Defects by Atomic Layer Deposition. *Nat. Commun.* 2014, 5, 1-9.

(64) Yulaev, A.; Guo, H.; Strelcov, E.; Chen, L.; Vlassiouk, I.; Kolmakov, A. Graphene Microcapsule Arrays for Combinatorial Electron Microscopy and Spectroscopy in Liquids. ACS *Appl. Mater. Interfaces* 2017, 9, 26492-26502.

Example 3

Figure 23:
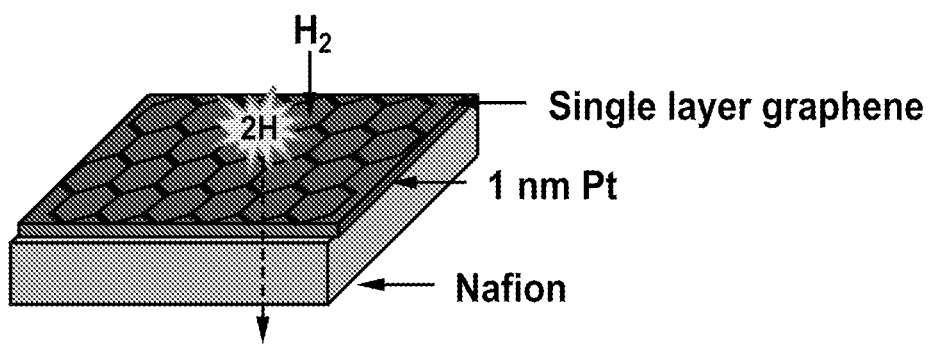
FIG. 23 is a schematic illustration of the remote catalysis design.

FIG. 23 is a schematic illustration of the remote catalysis design. Graphene shields the Pt catalyst from direct contact with hydrogen gas, but remote catalysis is still able to occur allowing the hydrogen gas to dissociate into protons and pass through the graphene or h-BN lattice.

Figure 24:
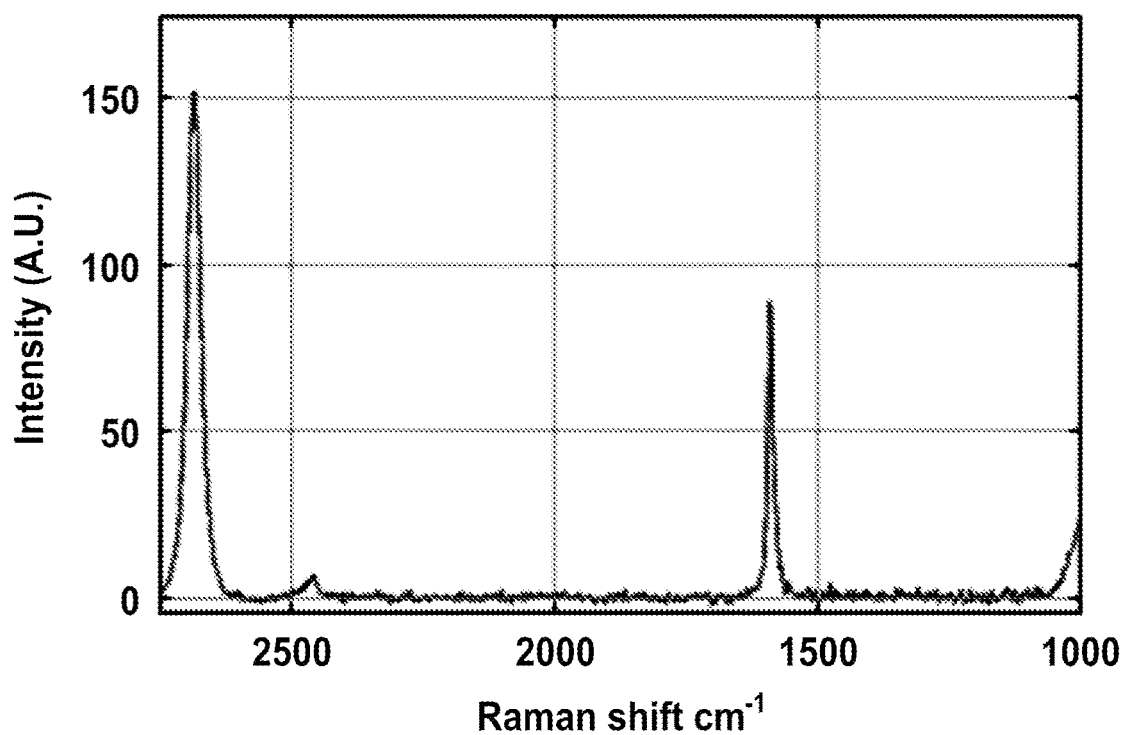
FIG. 24 shows the Raman spectra for graphene indicating high quality.
Figure 25:
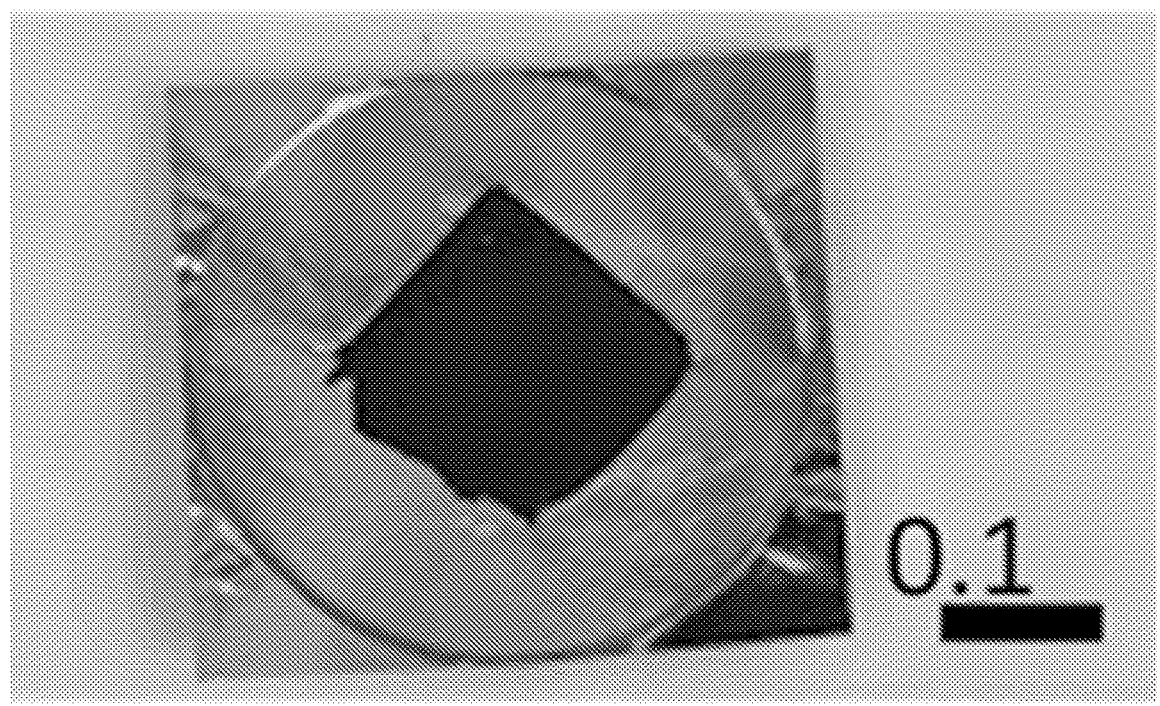
FIG. 25 is an image of a Nafion membrane with Pt catalyst pressed to graphene on copper foil.
Figure 26:
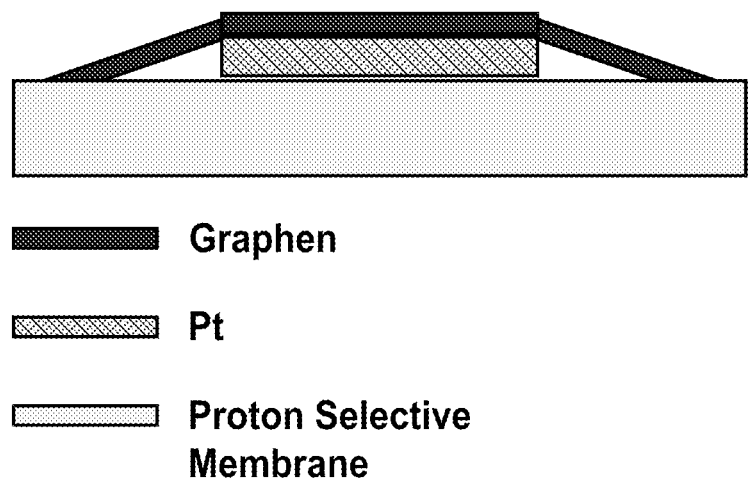
FIG. 26 is a schematic of the prepared membranes. Graphene completely covers the Pt catalyst in a fiber mat containing Nafion and Pt and amorphous carbon.

FIG. 24 shows the Raman spectra for graphene indicating high quality. FIG. 25 is an image of a Nafion membrane with Pt catalyst pressed to graphene on copper foil. FIG. 26 is a schematic of the prepared membranes. Graphene completely covers the Pt catalyst in a fiber mat containing Nafion and Pt and amorphous carbon.

Figure 27:
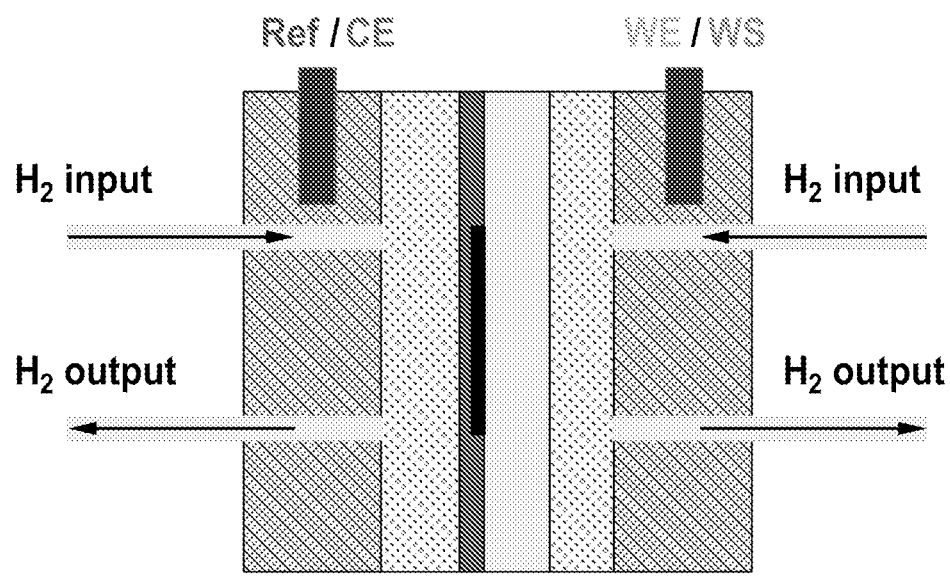
FIG. 27 schematically shows proton transport across Graphene-Pt-Nafion 212 sandwich device.
Figure 28:
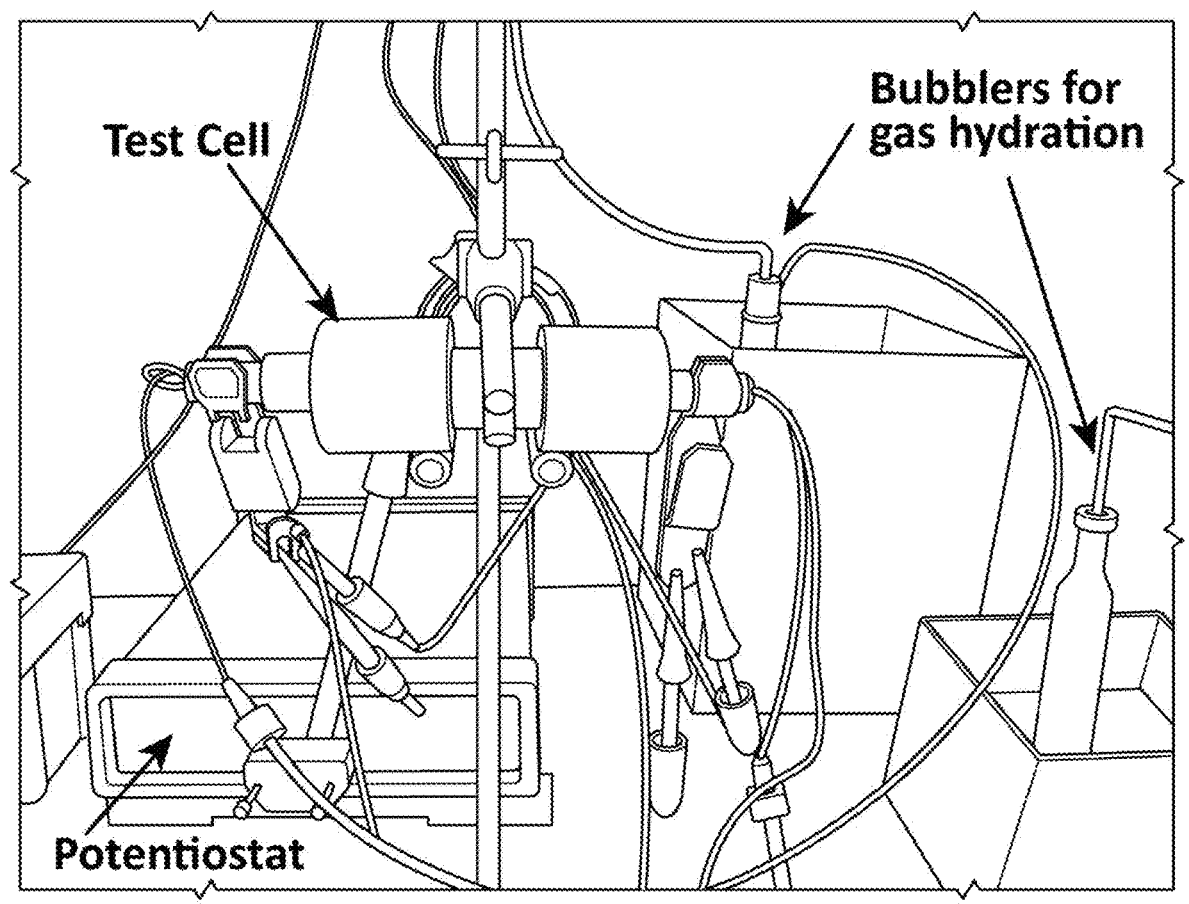
FIG. 28 is an image of the Graphene-Pt-Nafion 212 sandwich device test setup.

FIG. 27 schematically shows proton transport across Graphene-Pt-Nafion 212 sandwich device. FIG. 28 is an image of the Graphene-Pt-Nafion 212 sandwich device test setup. A current only results if proton transport occurs through the device which requires the molecular hydrogen to dissociate into protons via remote catalysis through the graphene via the Pt deposited on the other side and transport through the graphene lattice.

Figure 29:
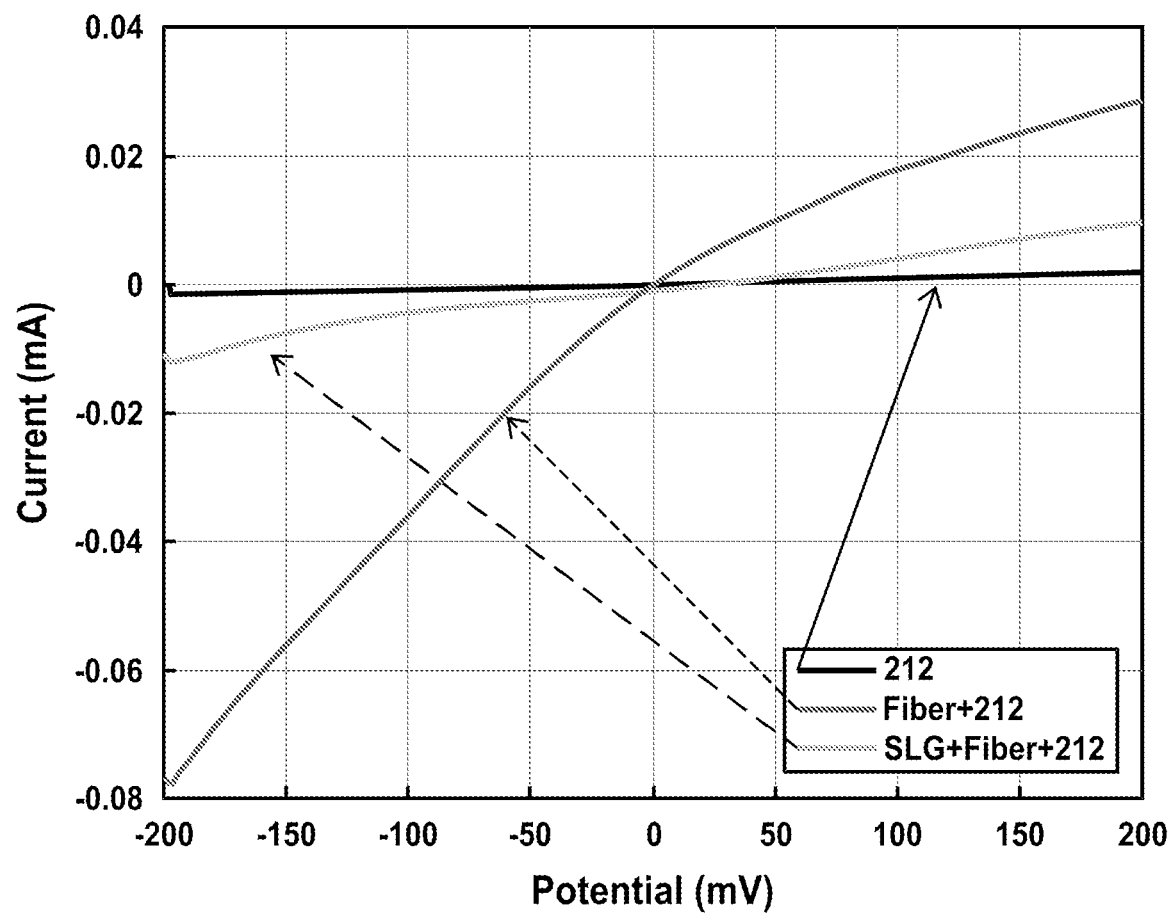
FIG. 29 shows the current for various resulting from various tests.

FIG. 29 shows the current for various resulting from various tests. The most current was obtained when the Pt catalyst (fiber +Nafion 212) was in direct contact with the $H_2$ gas (FIG. 29). Upon covering the Pt catalyst with graphene (single layer graphene (SLG) +fiber +Nafion 212), the current is reduced but not zero indicating remote-catalysis and subsequent proton transport through graphene (FIG. 29). The control membrane (212) indicates no transport occurs without the presence of a catalyst. (FIG. 29).

Figure 30:
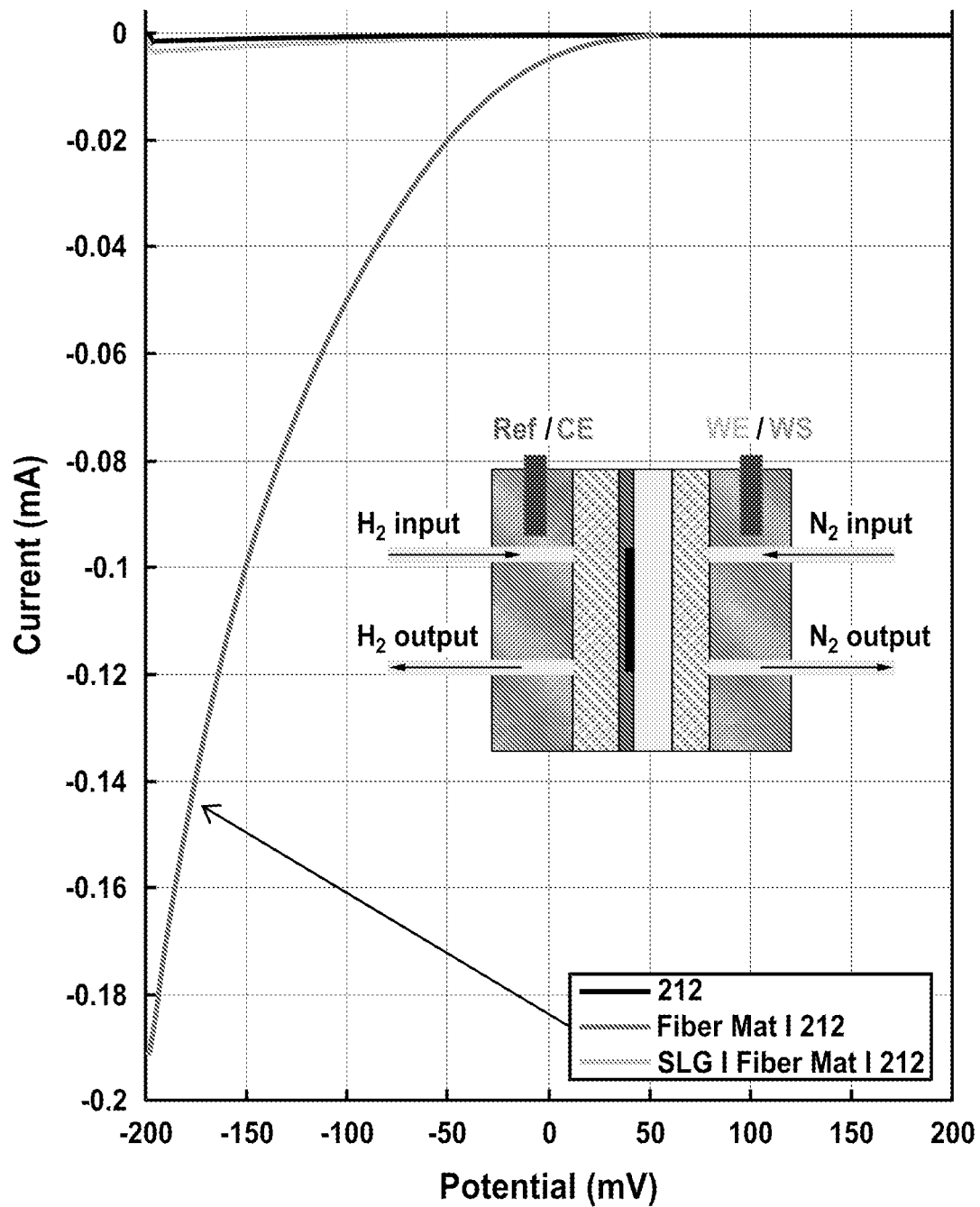
FIG. 30 shows the hydrogen crossover measurements for remote catalysis membrane and controls indicates the remote catalysis seen in FIG. 29 and confirms it is not hydrogen leakage through defects in graphene.

FIG. 30 shows the hydrogen crossover measurements for remote catalysis membrane and controls indicates the remote catalysis seen in FIG. 29 and confirms it is not hydrogen leakage through defects in graphene. Hydrogen gas in supplied to one side of the membrane and nitrogen is supplied to the other side of the membrane and the working electrode is on the nitrogen side meaning only hydrogen that leaks through the membrane is dissociated. The Nafion 212 and single layer graphene (SLG)-Fiber mat (Pt catalyst+Nafion+amorphous carbon)-Nafion 212 devices show negligible gas leakage compare to the control Fiber mat-Nafion 212 device (FIG. 30).

Figure 31:
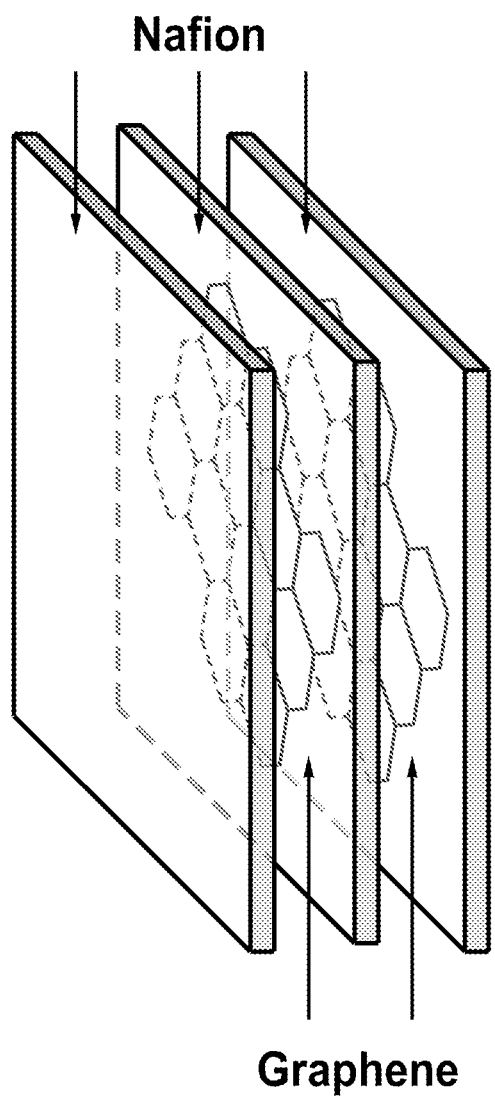
FIG. 31 is a schematic illustration of stacked devices of Nafion (211)-graphene-Nafion (211)-graphene-Nafion (211).
Figure 32:
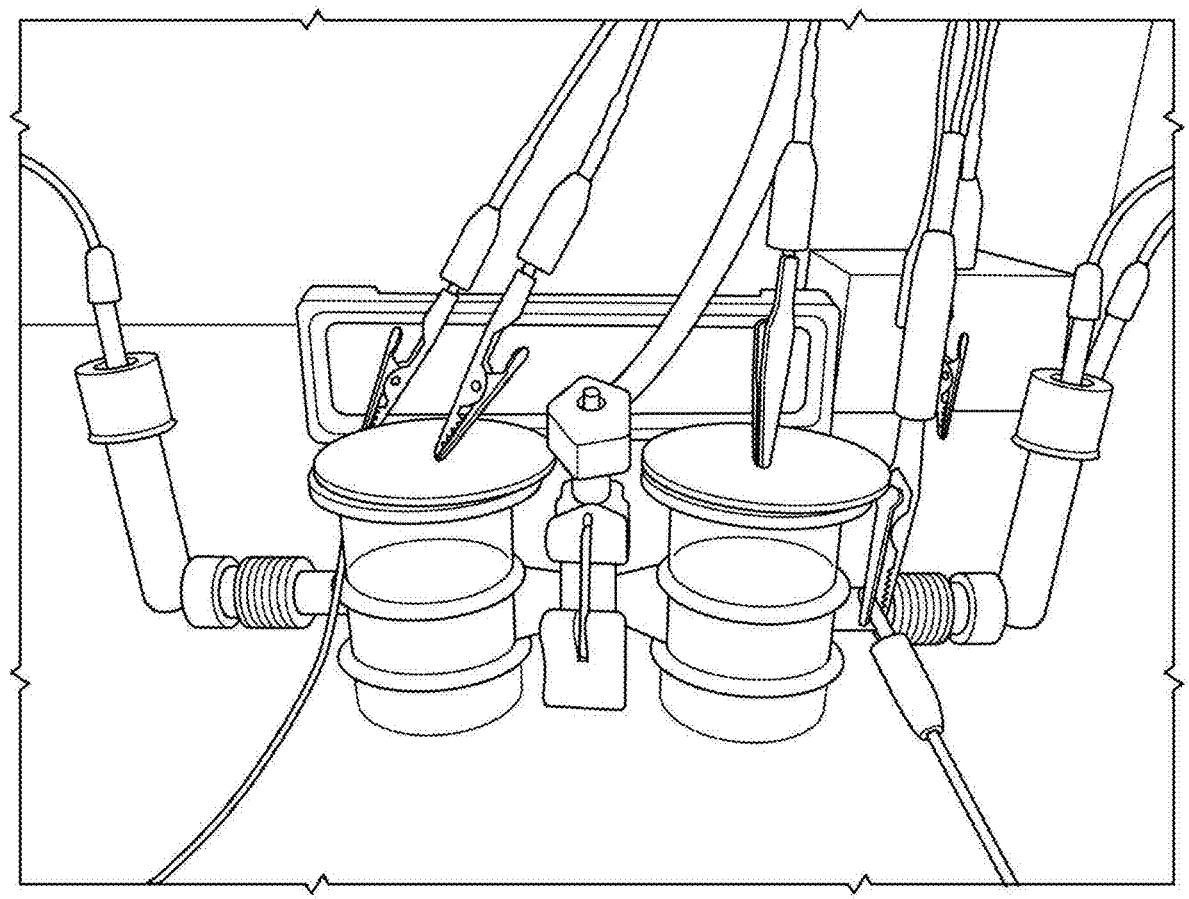
FIG. 32 is an image of the DS cell used for proton and $K^+$ ion transport through stacked devices of Nafion(211)-graphene-Nafion (211)-graphene-Nafion (211) in liquid phase.
Figure 33:
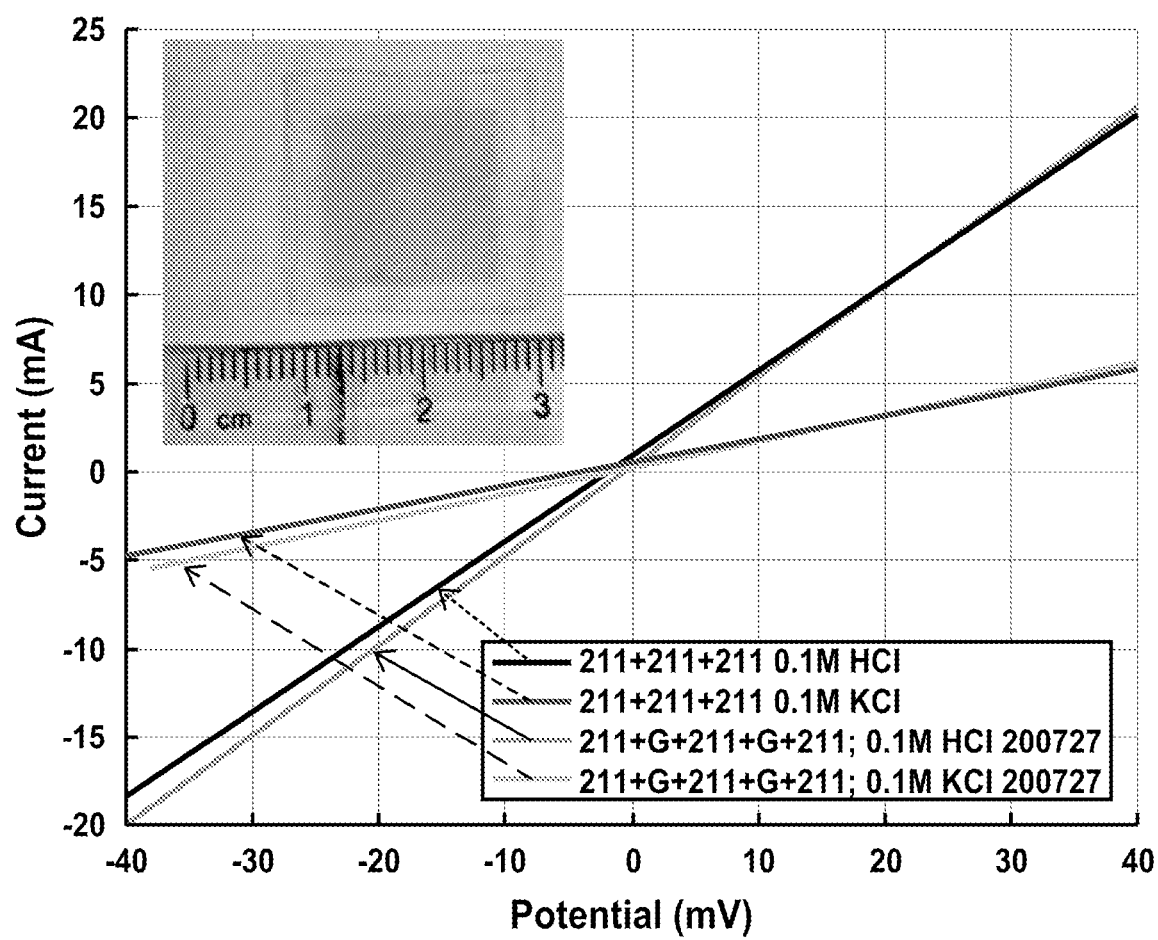
FIG. 33 is IV curves using HCl and KCl illustrating H+ and K+ ion movement through the membrane.

FIG. 31 is a schematic illustration of stacked devices of Nafion(211)-graphene-Nafion (211)-graphene-Nafion (211). FIG. 32 is an image of the DS cell used for proton and $K^+$ ion transport through stacked devices of Nafion(211)-graphene-Nafion (211)-graphene-Nafion (211) in liquid phase. FIG. 33 is IV curves using HCl and KCl illustrating H+ and K+ ion movement through the membrane.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The methods of the appended claims are not limited in scope by the specific methods described herein, which are intended as illustrations of a few aspects of the claims and any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The invention claimed is:

1. A catalytic proton transport membrane configured for remote catalysis, the catalytic transport membrane comprising:
    a two-dimensional (2D) material having a top surface and a bottom surface;
    a catalytic material deposited on the top surface of the two-dimensional material; and
    a first proton conducting polymer layer comprising a first proton conducting polymer;
    wherein the first proton conducting polymer layer is disposed on the catalytic material such that the catalytic material is disposed between the two-dimensional material and the first proton conducting polymer layer;
    wherein the membrane allows for proton transport through the membrane; and
    wherein, when used for remote catalysis, the remote catalysis comprising dissociation of a compound, wherein the compound is disposed proximate the bottom surface of the 2D material of the catalytic transport membrane, the 2D material shields the catalytic material from direct contact with the compound, the compound is catalytically dissociated, at least one product of the dissociation includes protons, and the catalytic proton transport membrane is configured such that said protons then pass through the 2D material.

2. The catalytic proton transport membrane of claim 1, wherein the 2D material comprises graphene, hexagonal boron nitride (h-BN), a transition metal dichalcogenide, a covalent organic framework, a metal organic framework, ultra-thin oxides, mica, or a combination thereof.

3. The catalytic proton transport membrane of claim 1, wherein the 2D material comprises graphene, hexagonal boron nitride (h-BN), or a combination thereof.

4. The catalytic proton transport membrane of claim 1, wherein the 2D material has an average thickness of 1.5 nm or less.

5. The catalytic proton transport membrane of claim 1, wherein the 2D material has lattice transparency.

6. The catalytic proton transport membrane of claim 1, wherein the catalytic material comprises Al, Ti, Cr, Mn, Fe, Co, Ni, Cu, Mo, Rh, Pd, Ag, Cd, Pt, Au, Zn, Ga, Pb, or a combination thereof.

7. The catalytic proton transport membrane of claim 1, wherein the catalytic material comprises a plurality of particles, a plurality of individual atoms, or a combination thereof.

8. The catalytic proton transport membrane of claim 1, wherein the catalytic material comprises a layer.

9. The catalytic proton transport membrane of claim 1, wherein the first proton conducting polymer comprises a polyether, a polysulfonate, a polysulfone, a poly(imidazole), a triazole, a benzimidazole, a polyester, a polycarbonate, a polymer derived from a pyridine monomer, a polyethylene, a fluoropolymer, derivatives thereof, or combinations thereof.

10. The catalytic proton transport membrane of claim 1, wherein the first proton conducting polymer comprises a sulfonated fluoropolymer, a poly(imidazole), or a combination thereof.

11. The catalytic proton transport membrane of claim 1, wherein the first proton conducting polymer comprises a copolymer of tetrafluoroethylene and perfluoro-3,6-dioxa-4-methyl-7-octene-sulfonic acid, poly(tetrafluoroethylene-co-2,2,4-trifluoro-5-trifluoromethoxy-1,3-dioxole), derivatives thereof, or combinations thereof.

12. A catalytic proton transport device comprising the catalytic proton transport membrane of claim 1, wherein the catalytic proton transport device comprises a plurality of the catalytic proton transport membranes, and wherein the plurality of catalytic proton transport membranes are stacked together to form the catalytic proton transport device.

13. A method of use of the catalytic proton transport membrane of claim 1, the method comprising using the catalytic proton transport membrane or catalytic proton transport device in a fuel cell, in a gas purification, in an energy conversion process, in environmental remediation, in an isotope separation, in a detector, in a membrane electrode application, or a combination thereof.

14. The method of claim 13, wherein the method comprises using the catalytic proton transport membrane in a gas purification and/or isotope separation.

15. The method of claim 14, wherein the gas purification comprises $D_2$-He separation; tritium-$^3$He separation; separation of H, D, and/or T from a mixture of HD, TD, and/or HT; or a combination thereof.

16. The method of claim 14, wherein the method comprises using the catalytic proton transport membrane for hydrogen gas purification, hydrogen isotope separation, or a combination thereof.

17. A method of use of the catalytic proton transport membrane of claim 1, the method comprising using the catalytic proton transport membrane or catalytic proton transport device for remote catalysis.

18. The method of claim 17, wherein the remote catalysis comprises dissociation of a compound, wherein the method comprises disposing the compound proximate the catalytic transport membrane or catalytic transport device such that the compound is not in direct contact with the catalytic material, and catalytically dissociating the compound, wherein at least one product of the dissociation includes protons which then pass through the 2D material.

19. The method of claim 18, therein the compound comprises hydrogen gas, deuterium gas, tritium gas, or a combination thereof.

* * * * *